United States Patent
Pirkola et al.

(10) Patent No.: US 6,611,516 B1
(45) Date of Patent: Aug. 26, 2003

(54) SHORT MESSAGE SERVICE SUPPORT OVER A PACKET-SWITCHED TELEPHONY NETWORK

(75) Inventors: Juha Matti Pirkola, Helsinki (FI); Heikki Juhani Einola, Espoo (FI); Jarmo Johannes Virtanen, Helsinki (FI); Aki Petteri Mikkonen, Espoo (FI); Tero Koskivirta, Espoo (FI)

(73) Assignee: Nokia Telecommunications Oyj, Helsinki (FI)

( * ) Notice: Subject to any disclaimer, the term of this patent is extended or adjusted under 35 U.S.C. 154(b) by 0 days.

(21) Appl. No.: 09/337,335

(22) Filed: Jun. 21, 1999

(51) Int. Cl.$^7$ .............................................. H04L 12/66
(52) U.S. Cl. ...................... 370/352; 370/401; 370/328; 455/466; 455/445; 709/249
(58) Field of Search ................................ 370/352, 355, 370/357, 331, 401, 389, 465, 466, 328, 349, 310; 709/249, 913; 455/432, 433, 435, 436, 466, 445, 412, 414

(56) References Cited

U.S. PATENT DOCUMENTS

| | | | |
|---|---|---|---|
| 5,793,762 A | | 8/1998 | Penners et al. ............. 370/389 |
| 5,862,481 A | | 1/1999 | Kulkarni et al. ............ 455/432 |
| 5,915,222 A | * | 6/1999 | Olsson et al. ............... 455/466 |
| 6,104,929 A | * | 8/2000 | Josse et al. ................. 455/445 |
| 6,108,559 A | * | 8/2000 | Åström et al. .............. 455/466 |
| 6,137,791 A | * | 10/2000 | Frid et al. ................... 370/352 |
| 6,370,390 B1 | * | 4/2002 | Salin et al. ................. 455/466 |
| 6,389,008 B1 | * | 5/2002 | Lupien et al. .............. 370/352 |
| 6,424,841 B1 | * | 7/2002 | Gustafsson ................. 455/466 |
| 6,442,159 B2 | * | 8/2002 | Josse et al. ................. 370/354 |

FOREIGN PATENT DOCUMENTS

| | | |
|---|---|---|
| EP | 0758835 | 2/1997 |
| EP | 0812085 | 12/1997 |
| EP | 0883313 | 12/1998 |
| WO | 9832300 | 7/1998 |
| WO | 9844640 | 10/1998 |
| WO | 9908468 | 2/1999 |
| WO | 0035176 | 6/2000 |

OTHER PUBLICATIONS

Ravi Jain et al., Mobile Internet Access and Qos Guarantees Using Mobile IP and RSVP with Location Registers, IEEE International Conference On Communications, US., New York, NY: IEEE, vol. Conf 5, Jun. 7, 1998, pp. 1690–1695, XP002114362.

Brian McConnell, "Using IP Telephony To Bypass Local Phone Monopolies", Mar., 1998, 8 pages.

Brian McConnell, "How to Build an Internet PBX", Apr., 1997, 11 pages.

(List continued on next page.)

*Primary Examiner*—Dang Ton
*Assistant Examiner*—Tri Phan
(74) *Attorney, Agent, or Firm*—Antonelli, Terry, Stout & Kraus, LLP

(57) ABSTRACT

According to an embodiment of the present invention, a system is provided that includes a cellular network, a Public Switched Telephone Network (PSTN) and a mobile IP-telephony network (MIPTN). Both the cellular network and the MIPTN include a Home Function and one or more visited Functions. MIPTN subscribers can roam within the MIPTN. Also, a Gateway Function interfaces the PSTN and the MIPTN to allow roaming between the cellular network and the MIPTN. The Gateway Function performs a dynamic mapping function between PSTN/cellular addresses (e.g., in E.16440 format) and MIPTN addresses (e.g., IP addresses) to allow registration and call delivery for subscribers roaming between the cellular network and the MIPTN. A similar type of Gateway Function also allows Short Message Service (SMS) messages to be delivered over the MIPTN as well.

7 Claims, 23 Drawing Sheets

OTHER PUBLICATIONS

Brian McConnell, "Comparative Analysis of Internet Telephony Gateways", Oct., 1997, 6 pages.
Dialogic, "Applications for IP Telephony", Nov. 19, 1997, 4 pages.
Dialogic, "IP Telephony Basics", Feb. 11, 1999, 7 pages.
Telogy, "Voice Over Packet Tutorial", 1999, 16 pages.
"A Primer on the H.323 Series Standard", Printed Apr., 1999, 25 pages.
"Wide Area Telephony", Printed Apr., 1999, 10 pages.
"VoIP—What's Ahead?", An Interview With RADVision CEO Ami Amir, Printed Apr., 1999, 2 pages.
"MicroLegend Internet Telephony Tutorial, Integrating Internet Protocol and Intelligent Networks", Printed Apr., 1999, 3 pages.
"LAN–Based Phone Systems and Business Telephony", Printed Apr., 1999, 9 pages.
Elemedia–H.323 Center—"IP Telephony Market", Printed Apr., 1999, 2 pages.
Elemedia–H.323 Center—"H.323 Version 2: New Features and Enhancements", Printed Apr., 1999, 3 pages.
Elemedia–H.323 Center—"H.323 Gatekeeper Overview", Printed Apr., 1999, 3 pages.
Elemedia–H.323 Center—"H.323 Gateway Overview", Printed Apr., 1999, 4 pages.
Elemedia–H.323 Center—"H.323 Protocol Stack", Printed Apr., 1999, 2 pages.
Elemedia–H.323 Center—"H.323 Overview", Printed Apr., 1999, 4 pages.
Elemedia–H.323 Center—"Internet Telephony–Related Protocols", Printed Apr., 1999, 2 pages.
Elemedia–H.323 Center—"Network Evolution", Printed Apr., 1999, 4 pages.
Elemedia–H.323 Center—"Products–PX3230S Classic H.323 Protocol Stack", Printed Apr., 1999, 3 pages.
Clarent, "Clarent Roaming Server–Give Customers Universal Access to the Benefits of IP Telephony", Printed Apr., 1999, 2 pages.
James Toga and Hani ElGebaly, "Demulsifying Multimedia Conferencing Over the Internet Using the H.323 Set of Standards", *Intel Technology Journal, $2^{nd}$ quarter '98*, 1998, 25 pages.

* cited by examiner

SHORT MESSAGE SERVICE SUPPORT OVER A PACKET-SWITCHED TELEPHONY NETWORK

CROSS-REFERENCE TO RELATED APPLICATIONS

The subject matter of this application is related to the subject matter of the following applications, all filed on Jun. 21, 1999: Ser. No. entitled "Mobility in Packet-Switched Telephony Networks"; Ser. No. entitled "Mobility Between IP Telephony Networks and Cellular Networks"; Ser. No. entitled "A Gateway Function For Supporting Mobility Between Packet-Switched Telephony Networks And Cellular Networks"; and Ser. No. entitled "Mobility Within A Packet-Switched Telephony Network."

BACKGROUND

This application generally relates to packet-switched telephony networks, such as IP telephony networks, and to cellular networks, and more particularly to a technique that allows subscribers to roam between an IP-telephony network and a cellular network.

IP-Telephony Networks

Voice or telephony services can now be provided over a packet-switched network, such as the Internet. These packet-switched-telephony networks are commonly referred to as IP telephony networks because the Internet Protocol (IP) is the primary protocol used over the Internet. One IP telephony standard, for example, is the International Telecommunications Union (ITU) H.323 standard.

FIG. 1 illustrates an example of an IP telephony network, also known as a Voice over IP (VoIP) Network. The VoIP network includes a gatekeeper function, one or more gateways and a packet-switched network (e.g., a portion of the Internet).

The gatekeeper function is optional and provides call authorization for both accepting and placing calls in its zone or area of control. A gatekeeper can also allocate bandwidth, can maintain call detail records, and can perform other network management functions.

A packet-switched-telephony gateway bridges a circuit switched network such as the Public Switched Telephone Network (PSTN) and a packet-switched network such as an IP network or the Internet. The (standard) IP telephony gateway bridges the PSTN and IP networks to allow phone-to-phone and phone-to-personal computer (PC) multimedia communications (voice, video and/or data). The IP telephony gateway provides the appropriate translation between transmission formats (for example, H.225.0 of an H.323 endpoint to/from H.221 of an H.320 endpoint) and between communication procedures (for example, H.245 of an H.323 endpoint to/from H.242 of an H.320 endpoint). The IP telephony gateway also performs call setup and clearing on both the network side and the switched circuit network side. Translation between video, audio, and data formats may also be performed in the gateway. In general, the purpose of the IP-telephony gateway is to complete the call in both directions between the network endpoint and the switched circuit network endpoint in a transparent fashion.

An example of IP telephony gateway is the H.323 gateway (implementing the ITU H.323 standard). H.323 gateways allow interoperation of H.323 systems with other audio/video conferencing systems on Integrated Services Digital Networks (ISDN), plain old telephone systems (POTS), Asynchronous Transfer Mode (ATM), and other transports. An IP telephony gateway operates as an endpoint on the IP-telephony network that provides real-time, two-way communication between IP telephony terminals on the IP-based network and other ITU terminals on a switched-circuit network, or to another IP-telephony gateway. Switched Circuit Network connectivity is achieved in the IP telephony context by using gateways for H.320 (ISDN), H.324, H.323, POTS, and other endpoints on other networks.

FIG. 1 is a diagram illustrating an example IP telephony network. Referring to FIG. 1, when an incoming call (1) reaches an IP telephony gateway (GW) (here indicated as Originating IP telephony GW), the gateway contacts the gatekeeper it is registered with asking to set up a call towards the dialed number received from the incoming call set up request (Access Request, ARQ, 2). The gatekeeper translates the dialed number (or directory number) into the IP address of the Destination IP-telephony gateway, i.e. the gateway that has to be reached in order to reach the final destination of the call, and provides this IP address to the originating IP telephony gateway (Access Confirmation, ACF, 3). The Originating IP-telephony GW sets up an IP-telephony call over the packet-switched network or IP network towards the Destination IP-Telephony GW providing its IP address and the dialed number (Call setup, 3). The Destination IP-telephony GW contacts the gatekeeper it is registered with (it may be the same as the Originating IP-telephony GW or a different gatekeeper) asking to accept a call incoming from the Originating IP-telephony GW (ARQ, 4) and directed towards the dialed number. If the gatekeeper grants the incoming call to the Destination IP-telephony GW (ACF, 5), the Destination IP-telephony GW establishes the PSTN call (call, 7), and then the call is established between the two IP-telephony GWs over the IP network (call establishment, 6). The destination IP-telephony gateway translates the IP packets into the appropriate format for transmission over the PSTN.

However, IP telephony standards and products are currently defined only for fixed networks. Mobility has not been considered in IP telephony in the sense that IP telephony subscribers are not allowed to roam between IP telephony networks.

For example, a subscriber in one area of the country is registered with a local gatekeeper. If the subscriber moves or travels to another part of the country, the subscriber will not be able to connect to the gatekeeper in the new part of the country because the new gatekeeper has no information describing the subscriber.

Cellular Networks

In addition, cellular subscribers can roam within cellular communication systems. In Global System for Mobile (GSM), a visiting location register (VLR) and a home location register (HLR) are used. The VLR contains relevant data of all mobile stations currently located in a serving Mobile Services Switching Center (MSC). The HLR is a database in charge of the management of the mobile subscribers. The data stored in the HLR includes service subscription information and location information (the identity of the currently serving VLR to enable routing of mobile-terminated calls).

When a visiting (or roaming) cellular subscriber is detected in a serving system, the location update processes notify the subscriber's HLR of the subscriber's presence in the serving system. When the subscriber is detected for the first time, the serving system creates a temporary record for the subscriber storing the service information and the location information. When the subscriber changes serving areas, the record in the HLR is simply updated with the new location information. In both cases the HLR is notified. When the HLR is notified by the serving system, it updates the location information in the subscriber's record. If the location information is different from the one previously stored in the record, the HLR cancels the subscriber's location in the previous serving system.

If subscriber B is roaming in a serving cellular system and a party A dials subscriber B's directory number, the call is routed through the PSTN to the home system of subscriber B. The MSC in the home system that receives the incoming call contacts subscriber B's HLR to determine how to route the call. The HLR determines that the call is for subscriber B and issues a request to subscriber B's current serving system for the information to route the call. The serving system allocates a telephone number (often called Roaming Number or RN) temporarily assigned to subscriber B to route the call and provides the RN to the HLR. The HLR provides the RN to the MSC in the home system, which in turn routes the call to the RN through PSTN. When the serving system receives the incoming call, it associates it with subscriber B based on the RN, and pages the subscriber B.

However, IP-telephony networks presently do not permit roaming or mobility within the IP-telephony network. Also, cellular networks and IP-telephony networks are distinct and incompatible networks and do not allow for roaming between cellular and IP-telephony networks.

Short Message Service (SMS) p As provided in Global System For Mobile Communications (GSM), Short Message Service (SMS) gives cellular network subscribers the ability to send and receive short text messages. Short messages usually contain about one page of text or less. Some systems limit the short message to 160 alphanumeric characters. However, there is presently no provision for delivering short messages over an IP-telephony network, or for delivering short messages to subscribers roaming between a cellular network and an IP-telephony network.

Therefore, a need exists for a technique that allows subscribers to roam within an IP-telephony network, to roam between an IP telephony network and a cellular network, and for the delivery of short messages over an IP-telephony network.

SUMMARY OF THE INVENTION

According to an embodiment of the present invention, a system is provided that includes a cellular network having a cellular Home Function which may include a Gateway Mobile Services Switching center (GW MSC) and a Home Location Register (HLR), and one or more cellular Visited Functions, each cellular Visited Function may include a Visited Location Register(VLR) and a MSC. The system also includes a Mobile IP-Telephony Network (MIPTN), including a MIPTN Home Function and one or more MIPTN Visited Functions.

The system also includes a Public Switched Telephone Network (PSTN) that is connected to the cellular network. The PSTN is also connected to the MIPTN via a Gateway Function that provides mobility support, including the storage of dynamic mappings obtained during registration. Alternatively, the Gateway Function interfaces the cellular network and the MIPTN directly.

According to an embodiment of the present invention, a technique is provided to allow roaming or mobility within an IP-telephony network (MIPTN). A subscriber registers with a Visited Function where the subscriber is located. The Visited Function then sends a message to the subscriber's MIPTN Home Function to provide updated subscriber location information. When a call is received that is intended for the subscriber, the IP address (or transport address) of the serving MIPTN Visited Function where the subscriber is registered (or located) is retrieved from the MIPTN Home Function. An IP-telephony call is then set up towards the IP address of the serving MIPTN Visited Function.

According to another embodiment of the present invention, a Gateway Function is provided that supports mobility or roaming between a Mobile IP-telephony Network (MIPTN) and a cellular network. When a cellular subscriber roams to the MIPTN, or when a MIPTN subscriber roams to the cellular network, the subscriber's Home Function and Visited Function will be located in different types of networks. The cellular network and the MIPTN are distinct and incompatible networks because different types of messages, signaling and addressing systems are used. The Gateway Function performs the interworking between the PSTN/cellular message formats and signaling and those in the MIPTN. In particular, the Gateway Function supports internetwork roaming by storing a dynamic mapping or correspondence between a subscriber identification (e.g., IMSI or MSISDN) and an address of a Visited Function where the subscriber has roamed. This dynamic mapping or correspondence is stored by a Gateway Function during the subscriber registration process when cellular subscribers roam to the MIPTN, or when MIPTN subscribers roam to the cellular network. This dynamic mapping stored in the Gateway Function allows the subsequent delivery of calls or SMS short messages via the Gateway Function to a subscriber that is roaming between networks.

DETAILED DESCRIPTION

Introduction

According to an embodiment of the present invention, techniques are disclosed to allow roaming within an IP-telephony network, to allow roaming between an IP-telephony network and a cellular network, and to allow delivery of Short Message Service (SMS) messages over an IP-telephony network. As used herein, an IP-telephony network having mobility or roaming capabilities is referred to herein as a Mobile IP-telephony network (MIPTN).

System Architecture

Figure 2:
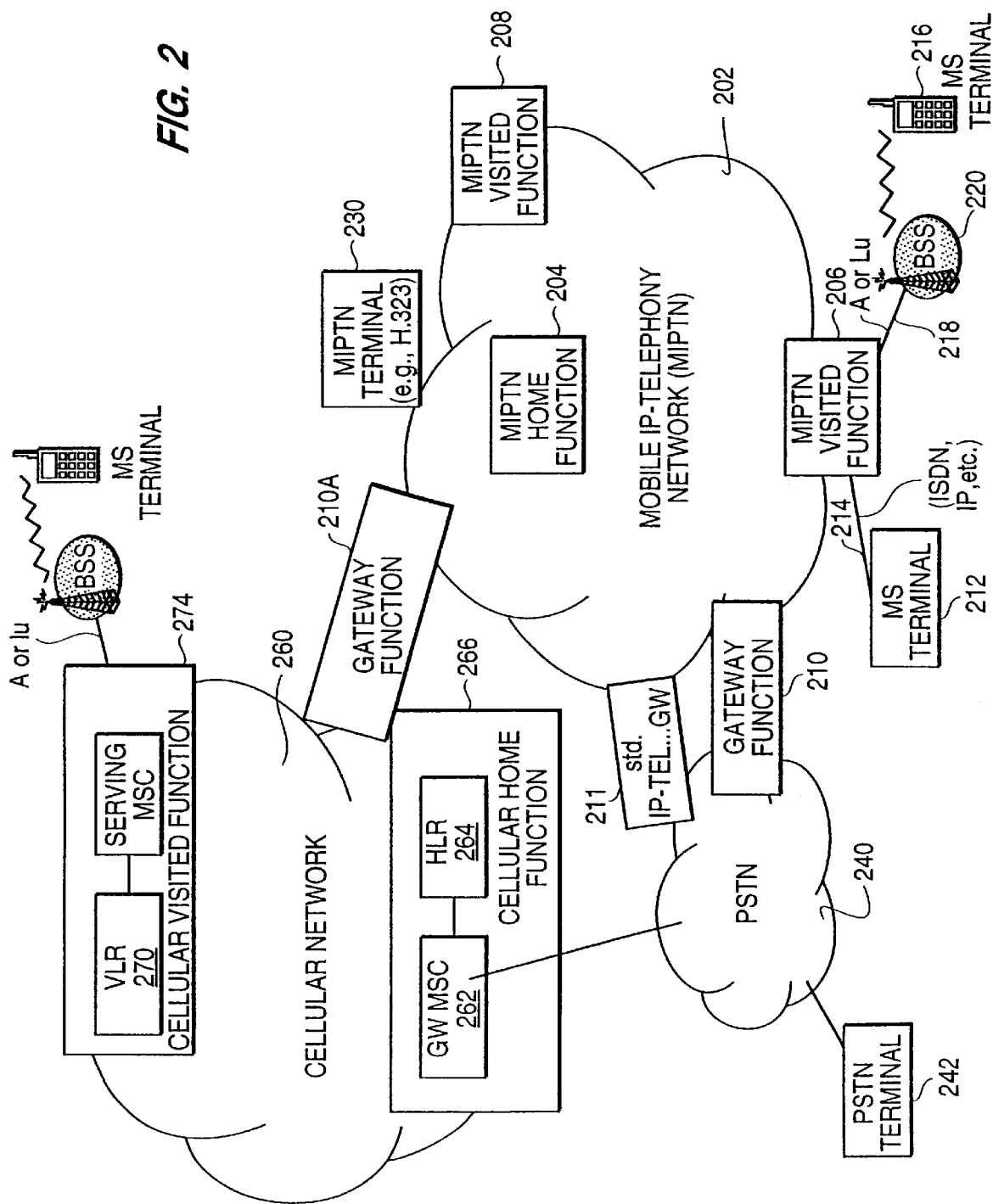
FIG. 2 is a block diagram illustrating an example system architecture according to an embodiment of the present invention.

Referring to the figures in which like numerals indicate like elements, FIG. 2 is a block diagram illustrating an example system architecture according to an example embodiment of the present invention. The system architecture includes a Mobile IP-telephony network (MIPTN) 202, a Public Switched Telephone Network (PSTN) 240 and a cellular network 260. Cellular network 260 may be for example, a Global System for Mobile Communications (GSM) network, or other cellular network.

The MIPTN 202 includes a MIPTN Home Function 204, one or more MIPTN Visited Functions (including MIPTN Visited Functions 206 and 208), and a Gateway Function 210. The MIPTN Home Function 204 stores subscriber profiles for MIPTN subscribers, receives and stores updated location information for MIPTN subscribers from Visited Functions. The MIPTN Home Function 204 can directly receive updated location information from a Visited Function in the MIPTN 202 if the subscriber is roaming within the MIPTN 202 or indirectly from a cellular Visited Function (e.g., VLR) if the MIPTN subscriber has roamed to the cellular network 260.

The MIPTN network 202 may include one or more subnetworks or areas, with each subnetwork served by a corresponding MIPTN Visited Function (i.e., the serving MIPTN Visited Function). An MIPTN Visited Function can receive update location messages from a subscriber located in its subnetwork or area requesting that the subscriber's location be updated in the subscriber's Home Function. The MIPTN Visited Function then provides the updated subscriber location information (i.e., updated location information describing where the subscriber can be reached) to the subscriber's Home Function. The subscriber's Home Function may be the MIPTN Home Function 204 for MIPTN subscribers or a cellular Home Function (e.g., HLR) for cellular subscribers.

According to an embodiment of the invention, cellular network subscribers and MIPTN subscriber can access or communicate with a MIPTN Visited Function using one or more different access techniques such as via radio or wireless or a cellular terminal, via an Integrated Services Digital Network (ISDN) terminal, via a personal computer over the Internet using the Internet Protocol (IP), etc. For example, referring to FIG. 2, Visited Function 206 is connected to a Base Station (BSS) 220 via line 218 (e.g., through a GSM A interface or UMTS Iu interface). Thus, a mobile subscriber (MS) terminal 216 may communicate with the MIPTN Visited Function 206 using a radio or cellular access via BSS 220. Similarly, a MS terminal 212, which may be a personal computer (PC) or an ISDN terminal, may communicate with the MIPTN Visited Function 206 via line 214 (which may be the Internet or an ISDN line, or other communication link). As a result, a subscriber can communicate or register with a MIPTN Visited Function using different types of subscriber terminals. However, it is not necessary to allow different types of subscriber terminals to communicate with the MIPTN Visited Function 206 so long as at least one type of terminal is accommodated (such as a MIPTN terminal or H.323 terminal, which may be provided as a personal computer connected via the Internet to the MIPTN Visited Function). MIPTN terminal 230 may, for example, register with or communicate with MIPTN Visited Function 208.

Figure 1:
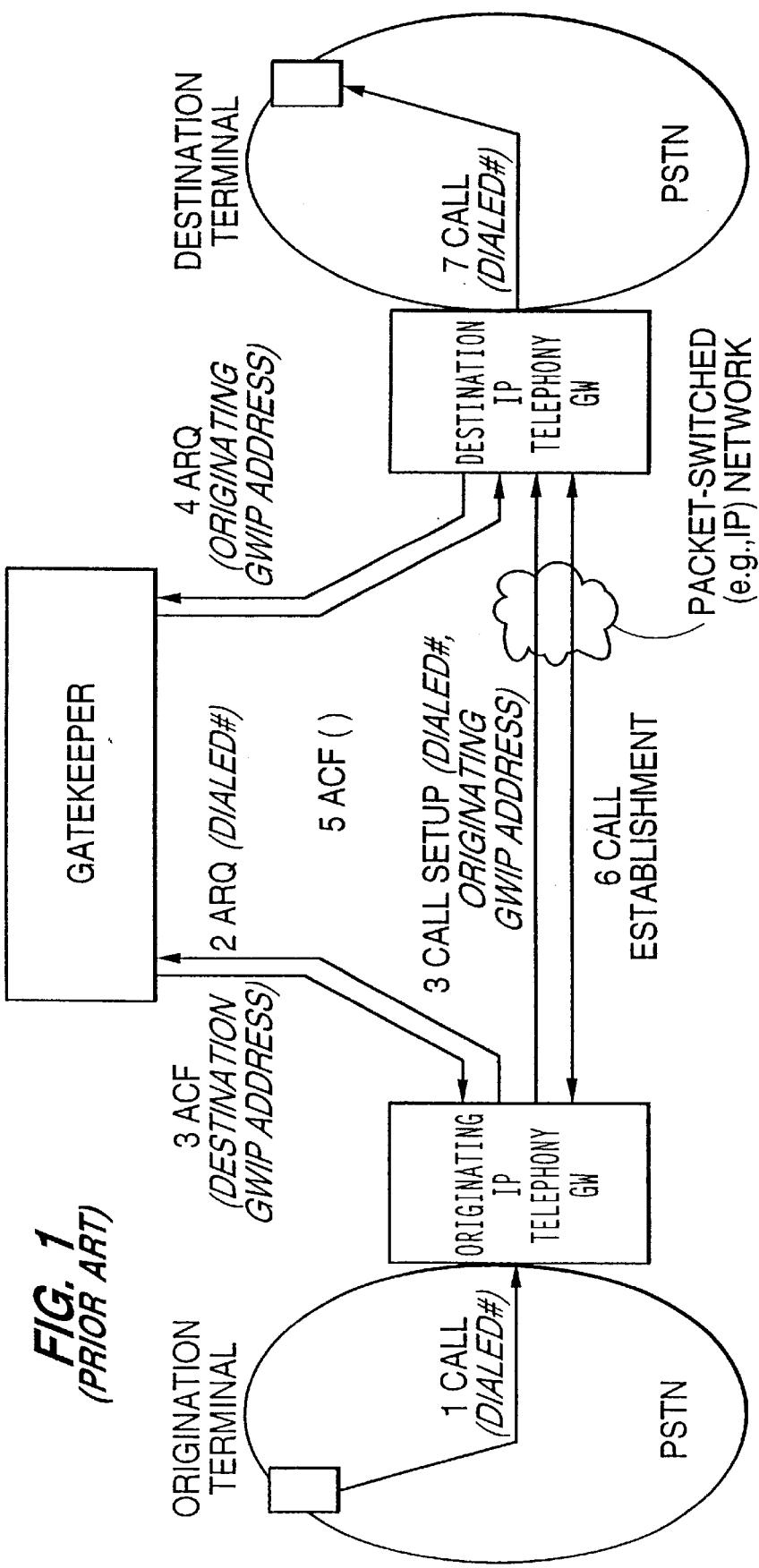
FIG. 1 is a diagram illustrating an example of an IP telephony network.

The MIPTN 202 is coupled to the PSTN 240 via a standard IP-telephony Gateway 211. As described above in connection with FIG. 1, the standard IP-telephony Gateway 211 bridges the PSTN (a circuit switched network) to the MIPTN 202 ( a packet-switched network). The standard IP telephony gateway 211 provides the appropriate translation or interworking between transmission formats (e.g., circuit-switched/packet-switched conversion, such as packetizing of the PSTN media to be sent over the MIPTN 202, unpacketizing the media) and between communication procedures (e.g., signaling conversion). The standard IP-telephony Gateway 211 may perform a static address translation between a directory number (e.g., MSISDN) and an IP address (e.g., the address of a Gatekeeper). It is a "static" address translation because the translation does not change when the subscriber roams or changes locations. This static address translation performed by standard IP-telephony Gateway 211, therefore, does not support mobility either within MIPTN 202 or between MIPTN 202 and cellular network 260.

According to an embodiment of the invention, the MIPTN 202 is also coupled to the PSTN 240 via one or more Gateway Functions, such as Gateway Function 210. There are typically many Gateway Functions 210. According to an embodiment, the Gateway Function 210 bridges or interfaces the PSTN 240 and the MIPTN 202. Alternatively Gateway Function 210 interfaces directly between MIPTN 202 and the cellular network 260, shown in FIG. 2 as Gateway Function 210A. Gateway Function 210 will hereinafter refer to both possible locations of the Gateway Function 210.

Gateway Function 210 provides the appropriate translation or interworking between transmission formats and between communication procedures. However, as described in detail below, the Gateway Function 210 also includes additional features or capabilities for mobility support, including storing a dynamic correspondence or mapping between a subscriber identification and an address of a Visited Function (in either the cellular network 260 or the MIPTN 202) where the subscriber has roamed (or is located). This dynamic correspondence stored by the Gateway Function 210 allows messages and calls to be successfully delivered via Gateway Function 210 to cellular subscribers roaming to the MIPTN 202, and to MIPTN subscribers roaming in the cellular network 260.

According to an embodiment of the invention, the MIPTN 202 can accommodate MIPTN subscribers roaming within the MIPTN 202. For example, a PSTN call to the MIPTN subscriber is routed to a Gateway, such as the standard IP-telephony Gateway 211 (or to Gateway Function 210). The Gateway 211 then requests an IP address from the subscriber's MIPTN Home Function 204 where the subscriber can be reached. The Home Function 204 returns the MIPTN network address (e.g., IP address) of the MIPTN Visited Function where the subscriber can be reached (e.g., where the subscriber is registered). The Gateway 211 then delivers the received PSTN call to the MIPTN subscriber by setting up an IP-telephony call towards the IP address of the serving MIPTN Visited Function. For a call received from another MIPTN subscriber (e.g., from MIPTN subscriber terminal 230), the Gateway 211 is not involved.

Cellular network 260 includes a gateway MSC (GW MSC) 262 and a Home Location Register (HLR) 264. The GW MSC 262 and HLR 264 may be considered to be a cellular network Home Function 266. The cellular network 260 is divided into several location areas, with each location area being served by a corresponding serving MSC 272 and Visiting Location Register (VLR) 270. Thus, the serving VLR 270 and the serving MSC may be considered to be a cellular network Visited Function 274. Only one pair of serving MSC and VLR are shown in FIG. 2.

The Gateway Function 210 and MIPTN 202 accommodate subscriber registration and call delivery for cellular subscribers which have roamed to the MIPTN 202 and for MIPTN subscribers which have roamed to the cellular network 260. In both cases call delivery involves querying the subscriber's Home Function (i.e., the HLR 264 for cellular subscribers and the MIPTN Home Function 204 for MIPTN subscribers) for updated location information for the subscriber stored during a registration process. The call is then forwarded via the Gateway Function 210 to the Visited Function of the network where the subscriber has roamed based on the updated location information. The call or message delivery for internetwork roaming will usually include the Gateway Function 210 using a dynamic mapping or correspondence stored during registration to identify an address of the serving Visited Function where the subscriber is located.

According to an embodiment of the present invention, each MIPTN subscriber or cellular network subscriber is identified by one or more unique identifiers or aliases. The aliases can take many forms, so long as it globally and uniquely identifies the user.

According to an embodiment of the invention, it is assumed that every mobile subscriber has been assigned at least one E.164 number, called the Mobile Subscriber ISDN number (MSISDN) in E.164 format (or other cellular/PSTN format) as the directory number for calling the subscriber. The MSISDN logically points to the subscriber's Home Function. According to an embodiment of the invention, each subscriber will also be identified by an International Mobile Subscriber Identity (IMSI). Both the MSISDN and IMSI logically point towards the subscriber's Home Function (either the MIPTN Home Function 204 for MIPTN subscribers or the cellular Home Function 266 for cellular subscribers).

With respect to the network that is not the subscriber's Home network, the subscriber's MSISDN and IMSI (or other subscriber identification) actually will point to the domain boundary (i.e., the boundary between the cellular network 260 and MIPTN 202). For example, for a MIPTN subscriber roaming in the cellular network 260, the routing tables in the cellular/PSTN networks will route a registration message from the MIPTN subscriber based on the subscriber's IMSI, hop-by-hop, from the cellular Visited Function until the registration message reaches one of the Gateway Functions 210. Thus, in the cellular network 260 or PSTN 240, a MSISDN or IMSI for a MIPTN subscriber will point to one of the Gateway Functions 210. Similarly, in the MIPTN 202, a MSISDN or IMSI for a cellular subscriber will point to one of the Gateway Functions 210.

In addition, as well understood by those skilled in the art, in the PSTN 240 and Cellular network 260 typically use common channel signaling based on the Signaling System 7 (SS7) protocol for network signaling (e.g,. Call setup, etc.). SS7 is actually a set of protocols, including Signaling Connection Control Part (SCCP). SCCP is responsible for addressing and routing of messages in general. SCCP provides a function, called Global Title Translation (GTT), which is used to find a real address of a node based on some Global Title. Examples of a Global Title include a MSISDN (e.g., or other E.164 number) and an IMSI. However, IP addresses cannot be used to route messages or calls in the PSTN 240 or cellular network 260.

In contrast, message or datagram routing in IP networks or the MIPTN 202 is performed based on the transport address (e.g., including an IP address and a port number). PSTN and cellular addresses (e.g., E.164 numbers, IMSI identifiers and MSISDN numbers) are not typically recognized in IP networks.

As a result, when a subscriber roams between the MIPTN 202 and the cellular network 260, the subscriber's Home Function and the serving Visited Function are in different domains (i.e., different types of networks) and use different types of addresses to identify the subscriber's location. For example, when a cellular subscriber (i.e., having a Home Function 266 in cellular network 260) roams to a MIPTN Visited Function 208 in the MIPTN 202, the serving MIPTN Visited Function 208 generates and provides the subscriber's updated location as an IP address, which will not be recognized in the subscriber's cellular Home Function 266 (i.e., cannot be used in HLR 264 to indicate subscriber's location). Likewise, when a MIPTN subscriber roams to the cellular network 260, the serving cellular Visited Function 274 provides updated location information compatible with the PSTN/cellular addresses (e.g., E.164 format), but which is incompatible with the IP addresses used by the subscriber's MIPTN Home Function 204. Therefore, the Gateway Function 210 must perform a function of address translation between the PSTN/cellular addresses and the MIPTN or IP addresses.

The Gateway Function 210 looks like either a MIPTN Home Function 204 or a MIPTN Visited Function towards the MIPTN 202. For example, the Gateway Function 210 appears to be a MIPTN Home Function to the MIPTN Visited Function 206 when updated location information is sent from the MIPTN Visited Function 206 towards the subscriber's HLR 264. The Gateway Function 210 appears to be a MIPTN Visited Function 206 to the MIPTN Home Function 204 when the Home Function 204 receives updated location information from a serving cellular Visited Function 274. In a similar manner, the Gateway Function 210 looks like either a cellular Home Function 266 (e.g., HLR 264) or a cellular Visited Function 274 to the cellular network 260.

The MIPTN Home Function

Figure 3:
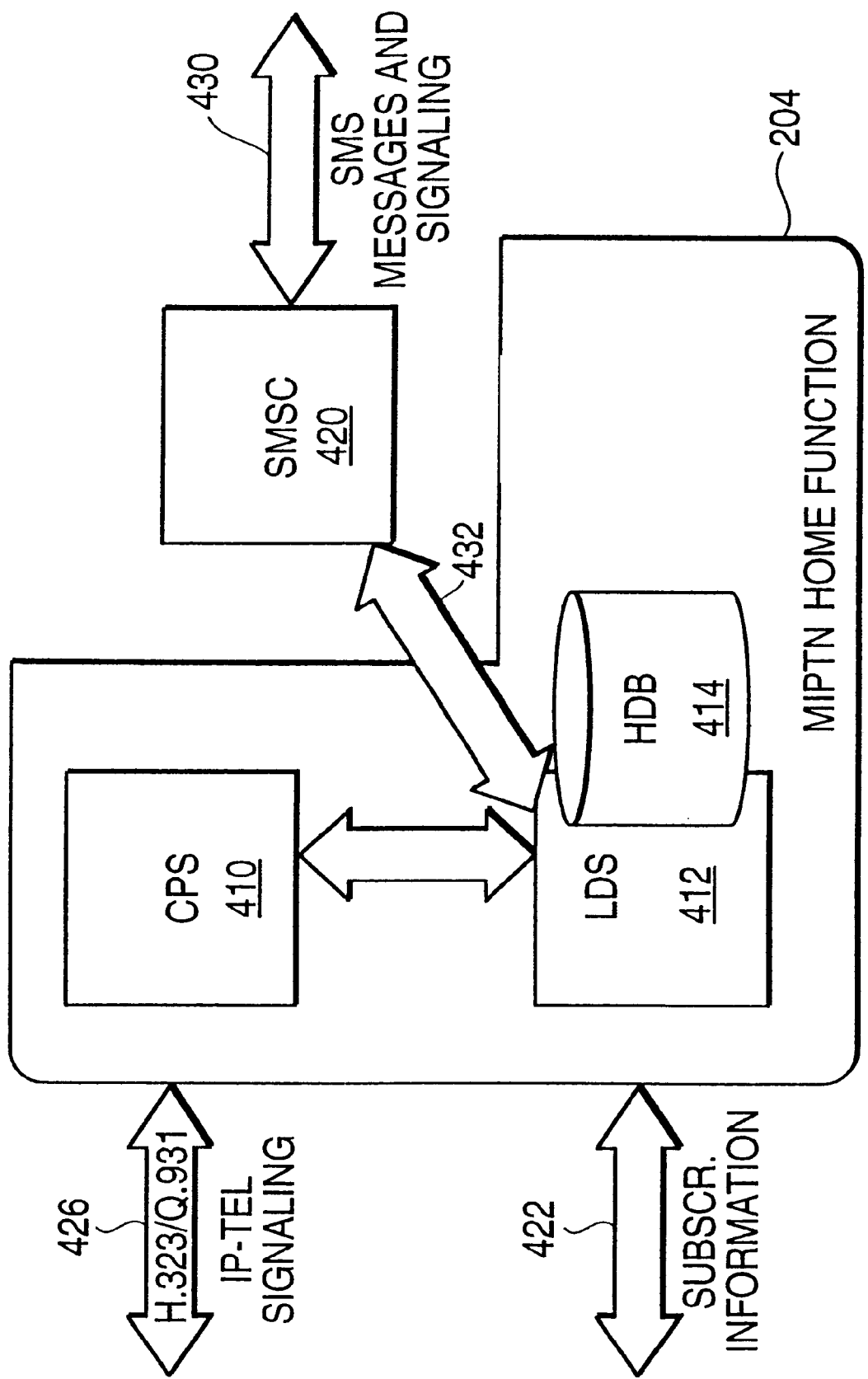
FIG. 3 is a block functional diagram illustrating a Mobile IP-telephony network Home Function according to an example embodiment of the present invention.

FIG. 3 is a block functional diagram illustrating a Mobile IP-telephony network Home Function according to an example embodiment of the present invention. The MIPTN Home Function 204 includes a Call Processing Service (CPS) 410, a Location and Directory Service (LDS) 412 and a Home Function Database (HDB) 414.

HDB 414 stores subscriber profiles and location information for MIPTN subscribers (e.g., the IP address and port number of the Visited Function identifying where the subscriber can be reached). The LDS 412 interfaces other entities to the HDB 414 by performing information storage and retrieval to HDB 414 upon request. The HDB also maintains the mapping or correspondence between IMSI, MSISDN and the transport address of the serving Visited Function where the subscriber can be reached. The transport address identifying where the subscriber can be reached will typically be the transport address of the serving MIPTN Visited Function if the MIPTN subscriber is roaming within the MIPTN 202, and will be the IP address of the Gateway Function if the MIPTN subscriber has roamed to the cellular network 260 (the serving cellular Visited Function can be accessed through the Gateway Function 210). The IMSI and MSISDN for a subscriber are static, whereas the serving transport address is dynamic (i.e., may change from time to time as the subscriber changes locations). Subscriber information (including updated subscriber location information provided to LDS 412 for storage in HDB 414 ) is provided via line 422.

The CPS 410 receives signaling for incoming calls and forwards the signaling to the appropriate Visited Function (or to the Gateway Function if directed to the cellular network 260). CPS 410 requests the transport address corresponding to an identified called subscriber (based on IMSI or MSISDN) from the LDS 412. LDS 412 provides the requested transport address to the CPS 410. The CPS then forwards the signaling to the call control entity (CCE) of the Visited Function or Gateway Function 410. Before allowing the call to be routed or established, the CPS 410 may also issue a status enquiry to the MIPTN Visited Function (or to the Gateway Function where the MIPTN subscriber has roamed to the cellular network) to ensure that the called subscriber is available to receive the call. IP-telephony signaling is provided over line 426 and may be, for example, H.323/Q.931 type signaling.

A MIPTN Short Message Service Center 420 is connected to the MIPTN Home Function 204 via line 432. The MIPTN Short Message Service Center (SMSC) 420 is somewhat similar to the SMSC provided in GSM, but SMSC 420 provides mobility support. SMSC 420 stores and forwards Short Message Service (SMS) messages to mobile subscribers (either MIPTN or cellular subscribers) located within the MIPTN network 202 or located in the cellular network 260, including subscribers that are roaming between the MIPTN 202 and the cellular network 260.

The MIPTN Visited Function

Figure 4:
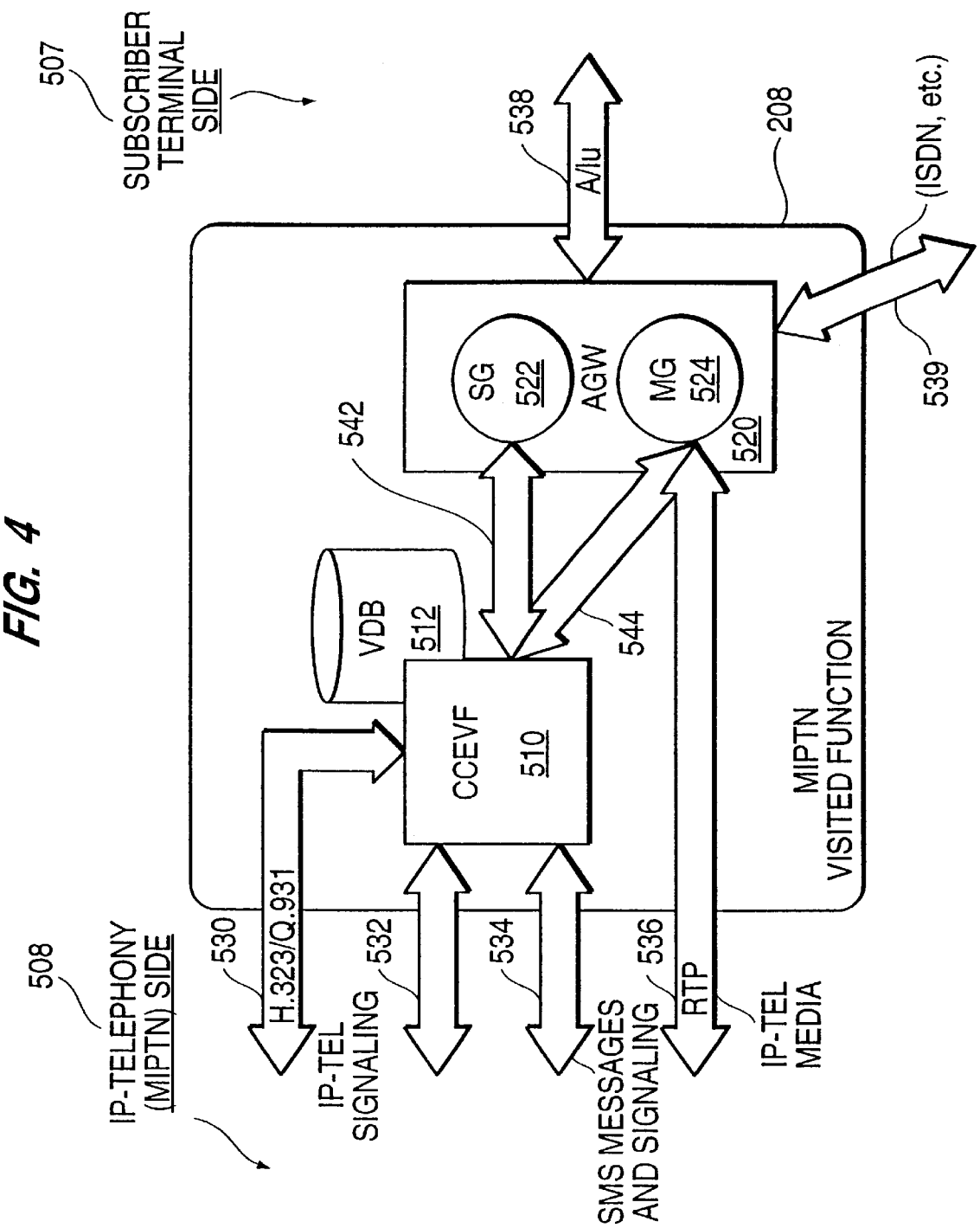
FIG. 4 is a functional block diagram illustrating a Mobile IP-telephony network Visited Function according to an example embodiment of the present invention.

FIG. 4 is a functional block diagram illustrating a Mobile IP-telephony network Visited Function according to an example embodiment of the present invention. The MIPTN Visited Function 208 includes a Call Control Entity for the Visited Function (CCEVF) 510 for controlling operation of the Visited Function, a Visited Function Database (VDB) 512 for storing subscriber information, and an Access Gateway (AGW) 520 for interfacing between the IP-telephony network (MIPTN 202) and the subscriber terminal (if not an IP-telephony terminal). As shown in FIG. 4, signals on the left or MIPTN side 508 are connected to the MIPTN 202, and signals on the right or subscriber terminal side 507 are connected to the subscriber terminals.

The AGW 520 is optional and includes a Signaling Gateway (SG) 522 and a Media Gateway (MG) 524. AGW 520 allows a subscriber terminal other than an IP-telephony terminal to register with or communicate with the MIPTN Visited Function 208. Examples include a radio or cellular subscriber terminal connected via line 538, an ISDN terminal connected via line 539, etc. If the subscriber terminal is an IP-telephony terminal, no AGW 520 is necessary because the media and signaling used by the IP-telephony subscriber terminal are compatible with the MIPTN Visited Function 208 (e.g., the Internet Protocol).

SG 522 provides an interworking function to translate or convert between IP-telephony signaling (e.g., H.323 signaling) for calls and SMS message signaling received from CCEVF 510 via line 542 and the type of signaling used by the subscriber terminal connected via lines 538 or 539. Similarly, MG 524 provides an interworking function to translate or convert between the IP-telephony media (e.g., packetized data, voice, video) received over line 536 and the SMS messages received over line 544 and the media type used by the subscriber terminal connected via lines 538 and 539. An example of an IP-telephony protocol for transporting media over IP is Real-time Transport Protocol (RTP), used on line 536.

The CCEVF 510 controls the overall operation of the Visited Function 206, including handling or controlling the subscriber registration process. At the beginning of the subscriber registration, the CCEVF 510 receives an update location message via line 530 from a subscriber which is registering with the Visited Function 208. In essence, the update location message from the subscriber is a request to the Visited Function to update the subscriber's location information maintained in the subscriber's Home Function (either the MIPTN Home Function or the cellular Home Function). The CCEVF 510 then issues the appropriate update location message to the subscriber's Home Function to provide the transport address (IP address) of the Visited Function 208 where the subscriber can be reached. The CCEVF 510 also receives and stores subscriber information (e.g., the subscriber's profile received from the subscriber's Home Function). The subscriber information is stored in the VDB 512. The CCEVF 510 also receives status enquiries from the Home Function 204. The CCEVF 510 receives SMS messages and signaling over line 534. The CCEVF 510 forwards the received messages via line 544 to MG 520 for translation and delivery to the subscriber. CCEVF 510 receives and stores subscriber profile from a Home Function during registration.

The MIPTN Visited Function manages micro-mobility of the subscriber terminal if the subscriber terminal is separate from the Visited Function. For example, in the case where the MIPTN Visited Function controls several location areas in MIPTN 202, the MIPTN Visited Function maintains in VDB 512 a dynamic mapping between each subscriber's IMSI and the location area in MIPTN 202 where the subscriber is located. Thus, while the subscriber terminal may roam within several location areas which are controlled by a single MIPTN Visited Function, the subscriber's Home Function 204 stores a single IP address at which the subscriber can be reached (i.e., the IP address of the serving MIPTN Visited Function). The Home Function 204 is not informed every time the subscriber terminal changes location areas, but rather, only when the subscriber roams to a location area controlled by a different Visited Function (i.e., having a different IP address).

There is at least one transport address (IP address and port number) corresponding to each MIPTN Visited Function. If only one address is used for a Visited Function 208, the address may be referred to as the VF_TA (for Visited Function transport address). However, according to an embodiment of the invention, different transport addresses corresponding to the Visited Function 208 may be used for different purposes. For example a CCEVF_TA transport address may be used for IP-telephony call signaling, an RTP_TA address may be used for IP-telephony media, and a SMS_TA may be used for SMS messages and signaling. Each of these addresses may be a different IP address, or may have the same IP address and a different port number (e.g., a different default port number may be used for each).

The Gateway Function 210

Figure 5:
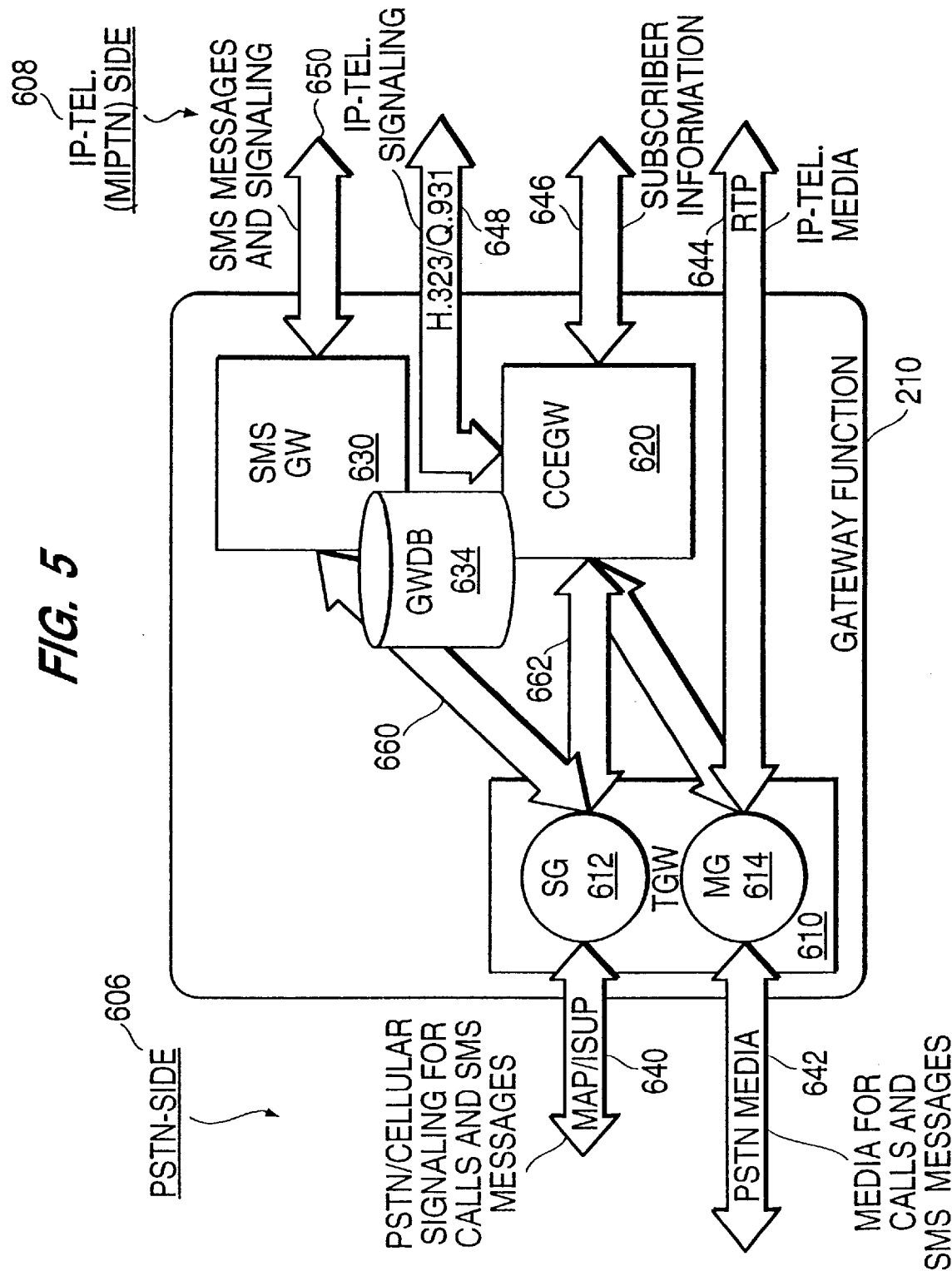
FIG. 5 is a functional block diagram illustrating a Mobile IP-telephony network Gateway Function according to an example embodiment of the present invention.

FIG. 5 is a functional block diagram illustrating a Mobile IP-telephony network Gateway Function according to an example embodiment of the present invention. Signals on the left or PSTN side 606 of Gateway Function 210 are connected to the PSTN 240 or cellular network 260, while signals on the right or IP-telephony side 608 are connected to the MIPTN 202. Gateway Function 210 includes a Trunking Gateway (TGW) 610, a Call Control Entity for the Gateway Function (CCEGW) 620, a SMS Gateway 630 and a Gateway Database (GWDB) 634.

TGW 610 interfaces the PSTN network 240 and the MIPTN 202, and includes a Signaling Gateway (SG) 612 and a Media Gateway 614. MG 614 provides the translation or interworking between the IP-telephony media stream (e.g., H.323 RTP streams) on line 644 and the PSTN Time Division Multiplexed (TDM) media stream on line 642. Likewise, SG provides a translation or interworking between the PSTN/cellular signaling (such as Mobile Application Part or MAP, and ISDN User Service Part or ISUP) provided on line 640 and the SMS signaling (received on line 650 and provided to SG 612 on line 660) and IP-telephony call signaling (such as H.323/Q.931 signaling received on line 648 and provided to SG 612 on line 662).

The CCEGW 620 controls overall operation of Gateway Function 620. The CCEGW 620 maintains a dynamic mapping or correspondence between the IMSI for each subscriber and the address of the Visited Function where the subscriber is located or registered (where the subscriber can be reached) where internetwork roaming is involved (i.e., where subscribers are roaming between cellular network 260 and MIPTN 202). This dynamic mapping information is obtained by the CCEGW 210 and stored in the GWDB 634 during a subscriber registration process (which must occur through a Gateway Function 210 for internetwork roaming). SMSGW 630 can access these dynamic mappings stored in GWDB 634 for the delivery of SMS messages and signaling received over line 650.

Static and Dynamic Address Translations

Some of the functionality of Gateway Function 210 and of the standard IP-telephony gateway 211 will be explained, with respect to address mappings or translations. First, for subscriber registrations, the MIPTN Visited Function and the standard IP-telephony gateway 211 can use a lookup table or a distributed technique (such as a Global Title Translation or a remote database) to statically translate the subscriber identification (typically, an IMSI, but not necessarily an E.164 number) to a Home Function IP address. If the visiting subscriber is roaming from the cellular network 260, the IP address actually leads to one of the Gateway Functions 210. (See, for example, static translation by Visited Function of IMSI to IP address of Gateway Function 210, steps 1–2, FIG. 8). This is a "static" translation because the IP address corresponding to the IMSI does not change when the subscriber changes locations or roams.

Secondly, during a first leg of call delivery (towards a Home Function), a calling entity or a standard IP-telephony gateway 211 also statically translates between the called subscriber identification (such as a MSISDN or IMSI) to an IP address of the subscriber's Home Function. (See, for example, static translation performed by standard Gateway 211 from MSISDN to Home Function IP address, steps 1–2, FIG. 10). This is also a static translation.

Finally, for call delivery on a roaming leg of the call from a MIPTN Home Function 204 to a cellular Visited Function or from a cellular Home Function 266 to a MIPTN Visited Function, the Gateway Function 210 must make an address translation based upon dynamic mappings between a subscriber identification and a Visited Function address established during the subscriber registration process. This dynamic mapping is a temporary correspondence between an IMSI (or other subscriber identification) and a cellular/PSTN address (such as a VLR number in E.164 format) or a temporary correspondence between an IMSI and an IP address (such as the IP address of a Visited Function). (See, for example, address translation performed by Gateway Function 210 based upon dynamic mapping between IMSI and VLR number of cellular Visited Function, steps 2–3, FIG. 11). The Gateway Functions 210 of the present invention store these dynamic address mappings during registration to support internetwork roaming and message and call delivery. These dynamic mappings are not performed or used in standard IP-telephony Gateways 211, and thus, standard Gateway 211 does not support mobility between the cellular and MIPTN networks.

Subscriber Registration

Subscriber registration is used to constantly maintain updated status and location information in the subscriber's Home Function, and should be performed each time the subscriber changes locations. The subscriber terminal may monitor one or more predetermined channels for broadcast information identifying the MIPTN subnetwork or the cellular subnetwork or location area. Based on this information, the subscriber or the subscriber terminal can determine whether the subscriber has changed locations (e.g., by comparing subscriber's current location to previous location), requiring a registration with the new Visited Function. Alternatively, a Visited Function may detect the presence of a new subscriber terminal in its area(s) of control, thus requiring subscriber registration. The registration with the new serving Visited Function provides updated subscriber location and status information to the subscriber's Home Function. The subscriber's updated status and location information stored in the subscriber's Home Function can then be used to deliver calls and messages to the called subscriber, regardless of the subscriber's location.

The subscriber status can include, for example, whether the subscriber terminal is connected or not connected to a network. A subscriber can also select other status options, such as blocking all incoming calls, while allowing the subscriber to place outgoing IP telephony calls. If a call is received that is intended for a subscriber that is either not connected to the network or has blocked all incoming calls, the receiving Gateway Function 210 (after obtaining the called subscriber's status and location from the called subscriber's Home Function), can either decline to place the requested call (e.g., return a busy or unavailable indication to the caller because the called party is not connected or incoming calls are blocked) or route the call to a predetermined IP address associated with the subscriber, such as the subscriber's answering machine or voice mail system.

Figure 6:
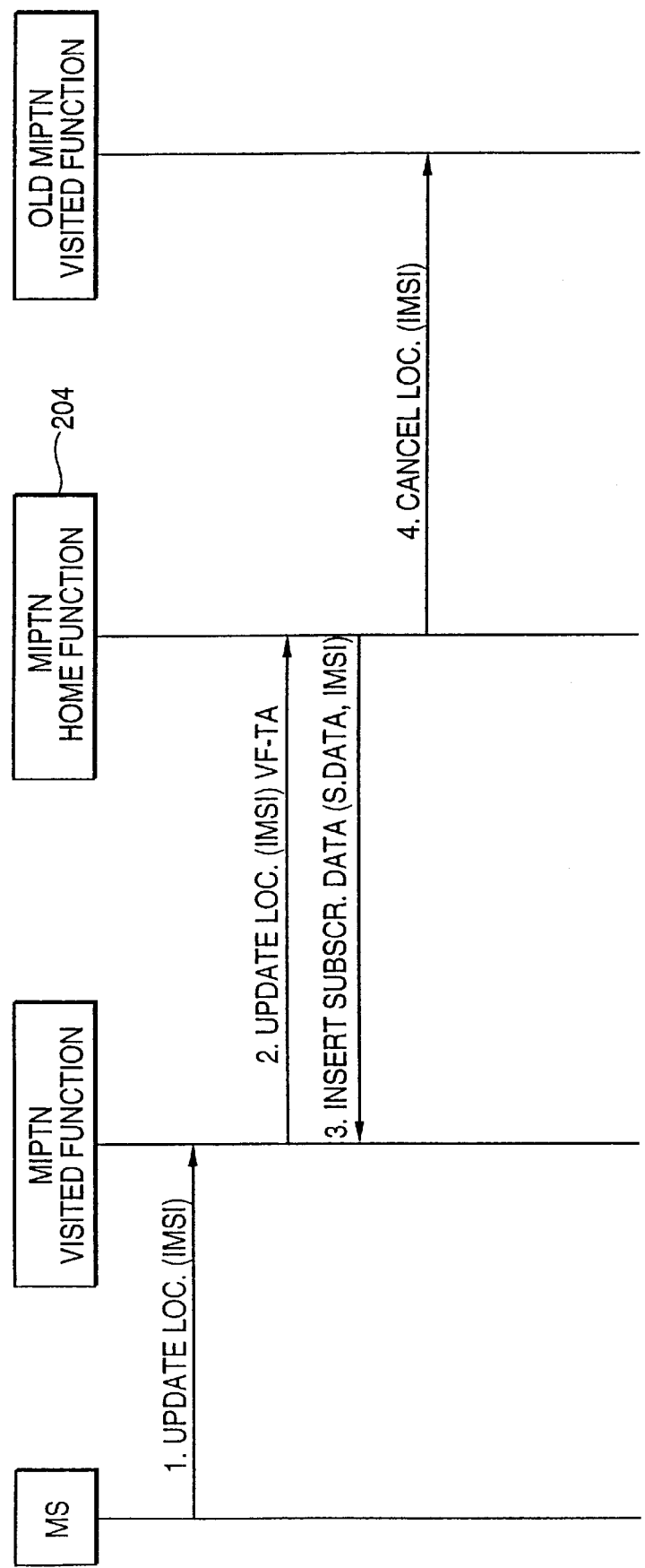
FIG. 6 is a diagram illustrating an example subscriber registration for a Mobile IP-Telephony subscriber roaming within the Mobile IP-Telephony Network.

FIG. 6 is a diagram illustrating an example subscriber registration for a Mobile IP-Telephony subscriber roaming within the Mobile IP-Telephony Network. In the registration process illustrated in FIG. 6, it is assumed that the MIPTN subscriber has roamed to a new location area or subnetwork within MIPTN 202. At step 1, the MIPTN subscriber terminal (MS in FIG. 6, meaning mobile subscriber) sends an update location message to the serving MIPTN Visited Function, providing the subscriber's IMSI. As noted above, the subscriber terminal can access the MIPTN Visited Function using a variety of different access techniques (e.g., IP-telephony, ISDN, radio or cellular).

Because the IMSI points to the Home Function 204, the MIPTN Visited Function statically translates the IMSI to the IP address of the Home Function 204. For example, the Visited Function can use a database or look-up table or other technique to statically translate the subscriber's IMSI to the transport address of the subscriber's Home Function 204. In addition (or in the alternative), a distributed technique, such as Global Title Translation can be used to identify the actual IP address of the Home Function 204 based on the subscriber's IMSI.

At step 2 of FIG. 6, the MIPTN Visited Function sends an update location message (e.g., packet or datagram) to the subscriber's MIPTN Home Function 204 and provides the transport address of the Visited Function (VF_TA) and the status of the subscriber. The VF_TA is the IP address at which the subscriber can be reached in the MIPTN 202. The HDB 414 (FIG. 3) receives and stores the updated location information (e.g., VF_TA) and status information for the subscriber. Where different addresses are used at the Visited Function, the Visited Function may provide the CCEVF_TA.

At step 3 of FIG. 6, the Home Function 204 sends an insert subscriber data message to the serving Visited Function (using the VF_TA address as the destination address) to provide the subscriber's complete profile (or portion thereof) to the serving Visited Function. The VDB 512 (FIG. 4) receives and stores the subscriber profile. At step 4 of FIG. 6, the Home Function 204 retrieves the transport address which previously indicated the location of the subscriber (the address of the old Visited Function). The Home Function 204 then sends a message to cancel the location information and subscriber profile stored at the old Visited Function for the subscriber (e.g., providing the IMSI) because the subscriber is no longer located at the old Visited Function.

Figure 7:
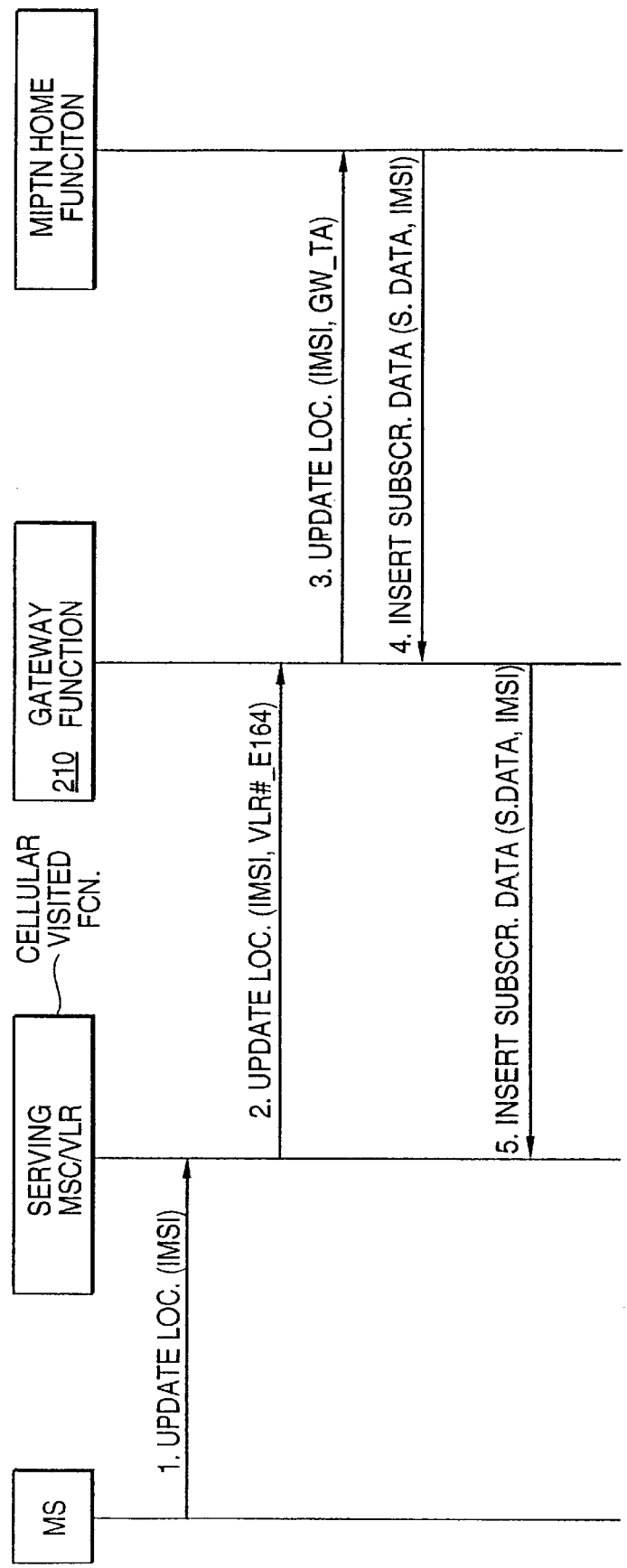
FIG. 7 is a diagram illustrating an example subscriber registration for a Mobile IP-Telephony subscriber roaming to a cellular network.

FIG. 7 is a diagram illustrating an example subscriber registration for a Mobile IP-Telephony subscriber roaming to a cellular network. In FIG. 7, it is assumed that a MIPTN subscriber (i.e., having a Home Function 204 in the MIPTN 202) has roamed to a cellular network 260. At step 1 of FIG. 7, the subscriber terminal (MS) sends an update location message to the serving MSC 272/VLR 270 in the serving cellular Visited Function 274 in cellular network 260, and provides the subscriber's IMSI. Step 1 is performed as a cellular procedure.

At step 2 of FIG. 7, the serving VLR 270 sends an update location message as a cellular procedure to the subscriber's Home Function based on the subscriber's IMSI, providing the VLR number in E.164 format (as the subscriber's location in the cellular network 260). The serving MSC/VLR is not aware that the subscriber is a MIPTN subscriber. In this case, the subscriber's Home Function is located in the MIPTN 202 and the subscriber's IMSI, therefore, points to one of the Gateway Functions 210.

At step 3 of FIG. 7, the Gateway Function 210 receives the update location message as a cellular procedure or message, including the subscriber's IMSI and the VLR number in E.164 format. The Gateway Function 210 stores the dynamic correspondence between the IMSI and the VLR number in a table. The Gateway Function 210 then translates the update location message from a cellular procedure to a MIPTN procedure or update location message, which is sent along with the IP address of the Gateway Function 210 (GW_TA) to the subscriber's Home Function 210. Gateway Function 210 can obtain the IP address of the Home Function 204 from the subscriber's IMSI because, in MIPTN 202, a MIPTN subscriber's IMSI points to the MIPTN Home Function 204. Alternatively, the Gateway Function 210 can use a distributed technique such as or similar to Global Title Translation to obtain the IP address of the MIPTN Home Function 204.

At step 4 of FIG. 7, the MIPTN Home Function 204 receives the update location message, including the subscriber's IMSI and the IP address of the Gateway Function 210. The Home Function 204 stores the IP address of the Gateway Function (GW_TA) as the location of the subscriber. Gateway Function 210 then issues an insert subscriber data message back to the Gateway Function 210 at step 4, including the subscriber's profile or data (s. Data) and the subscriber's IMSI.

At step 5 of FIG. 7, the Gateway Function 210 receives the insert subscriber data message, and identifies the VLR number corresponding to the IMSI. Gateway Function 210 then sends an insert subscriber data message as a cellular/

PSTN procedure to the VLR number (the serving VLR). The serving VLR then stores the subscriber profile corresponding to the IMSI.

Although not shown in FIG. 7, the MIPTN Home Function could also send a message to the old Visited Function to cancel the previous location and profile. If the old Visited Function is a MIPTN Visited Function, the MIPTN Home Function 204 can send this cancel message directly to the old MIPTN Visited Function. However, if the old Visited Function is actually a cellular Visited Function 274 (in the cellular network 260), the cancel message must be sent through the Gateway Function 210, which forwards a cancel message to the appropriate VLR number (in E.164 format) previously stored in the Gateway Function 210 as corresponding to the same IMSI.

Figure 8:
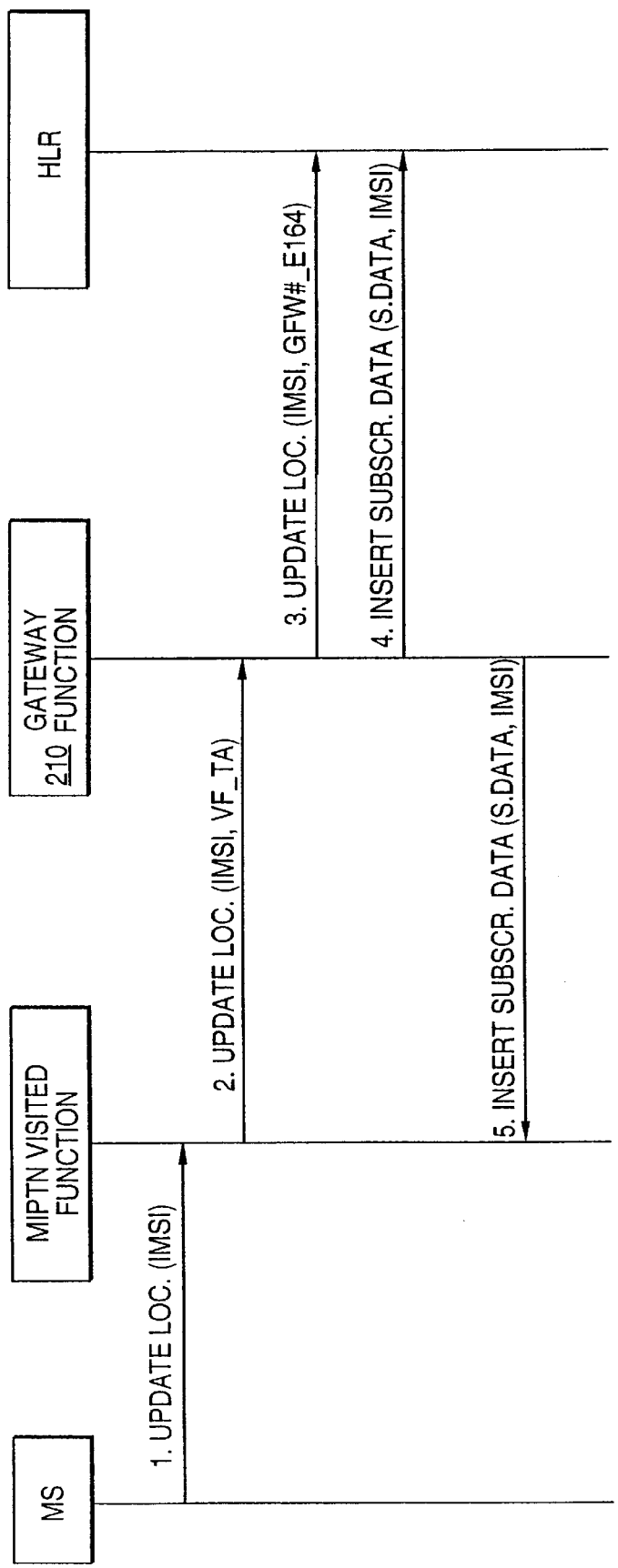
FIG. 8 is a diagram illustrating an example subscriber registration for a cellular network subscriber roaming to a Mobile IP-Telephony network.

FIG. 8 is a diagram illustrating an example subscriber registration for a cellular network subscriber roaming to a Mobile IP-Telephony network. In FIG. 8, it is assumed that a cellular subscriber has roamed to a MIPTN 202. At step 1 of FIG. 8, the cellular subscriber (MS) sends an update location message to the serving MIPTN Visited Function, including the subscriber's IMSI. As described above, the subscriber terminal can access or register with the MIPTN Visited Function using a variety of different access techniques (IP-telephony terminal, radio terminal, ISDN terminal etc.). Thus, the MIPTN Visited Function may translate the signaling and data received from the subscriber terminal to IP-telephony format (see FIG. 4) if not already in IP-telephony format.

At step 2 of FIG. 8, the MIPTN Visited Function sends an update location message to the IP address of the Home Function of the subscriber. In this case, the cellular subscriber's IMSI in the MIPTN 202 points to one of the Gateway Functions 210. The MIPTN Visited Function therefore statically translates the IMSI to an IP address that leads to one of the Gateway Functions 210. Thus, the MIPTN Visited Function sends the update location message to the Gateway Function 210. The message includes the subscriber's IMSI and the IP address of the MIPTN Visited Function (VF_TA). The CCEVF_TA address can be sent if different transport addresses are used for the MIPTN Visited Function.

At step 3 of FIG. 8, the Gateway Function 210 receives the update location message as a MIPTN message, including subscriber's IMSI and the subscriber's location (i.e., the VF_TA). The Gateway Function 210 stores the dynamic correspondence of the IMSI and the VF_TA in a table. The IMSI points to the cellular Home Function 266 of the subscriber (in cellular network 260). Then, the Gateway Function 210 sends an update location message as a cellular/PSTN procedure or message to the subscriber's HLR 264 in the cellular Home Function 266. This update location message includes the subscriber's IMSI and the Gateway Function number of Gateway Function 210 provided as a E.164 number or in another PSTN/cellular format. In other words, the Gateway Function number is provided as a pseudo-VLR number to the HLR, to identify the "VLR" at which the subscriber has registered. But in this case, the VLR number is a pseudo-VLR number because the number actually identifies the Gateway Function 210 through which the subscriber can be reached (i.e., the Gateway Function number in E.164 format appears to be a VLR number to the HLR). The subscriber's HLR 264 (FIGS. 1 and 2) then stores the updated status and location information (i.e., the Gateway number) for the IMSI.

At step 4 of FIG. 8, the HLR 264 sends an insert subscriber data message as a cellular/PSTN procedure or message to the Gateway Function 210 (based on the Gateway Function number provided in E.164 format), providing the subscriber's IMSI and the subscriber's profile (s. data) maintained in the HLR 264.

At step 5 of FIG. 8, the Gateway Function 210 receives the insert subscriber data message from the HLR. The Gateway Function 210 identifies the IP address corresponding to the IMSI stored earlier (i.e., the VF_TA). The Gateway Function 210 then sends an insert subscriber data message as a MIPTN procedure or message to the serving MIPTN Visited Function, providing the subscriber' IMSI and the subscriber data or profile to the serving Visited Function. The VDB 512 (512) in the MIPTN Visited Function 208 then stores the subscriber data or profile corresponding to the IMSI.

Although not shown in FIG. 8, the HLR may also send a cancel location (or cancel profile) message to the old serving Visited Function. If the subscriber was previously registered with another serving MIPTN Visited Function, the old VLR number would identify the Gateway Function 210, and the Gateway Function would send a cancel location message to the old serving MIPTN Visited Function (based on a previously stored dynamic IP address or VF_TA for this same IMSI).

Some Alternative Embodiments for Visited Functions and Subscriber Terminals

According to an embodiment of the invention, the subscriber terminal and the MIPTN Visited Function are separate and distinct entities (e.g., see FIG. 2). In such case, the subscriber terminal contacts the Visited Function to perform registration, and the Visited Function communicates with the other entities to provide updated location information to the subscriber's Home Function. In such case, one Visited Function can accommodate multiple subscribers. Where multiple subscribers are connected to one Visited Function, there may be one IP address for all subscribers, or different IP addresses assigned to each subscriber (but each IP address still pointing to the Visited Function). In the event that one IP address is used for all (or multiple) subscriber terminals connected to the Visited Function, there must be a way for the Visited Function to distinguish between messages directed to each subscriber terminal. Thus, a different port number can be assigned to each subscriber, or the IMSI for each subscriber can be provided within each message to identify the intended recipient (subscriber).

However, according to an alternative embodiment of the invention, the MIPTN Visited Function can be provided as part of the subscriber terminal (e.g., the Visited Function may be one or more software routines running on the subscriber terminal). In this embodiment, it is a Visited Function software routine in the subscriber terminal that contacts the subscribers' Home Function (either directly or through the Gateway Function 210) to update the subscriber's location information maintained at the Home Function. The subscriber terminal would also directly receive other messages sent to the Visited Function that are intended for the subscriber. In the case that the Visited Function is provided as a part of the subscriber terminal, the IP address of the Visited Function may also be the address of the subscriber terminal.

Call Delivery Examples

Figure 9:
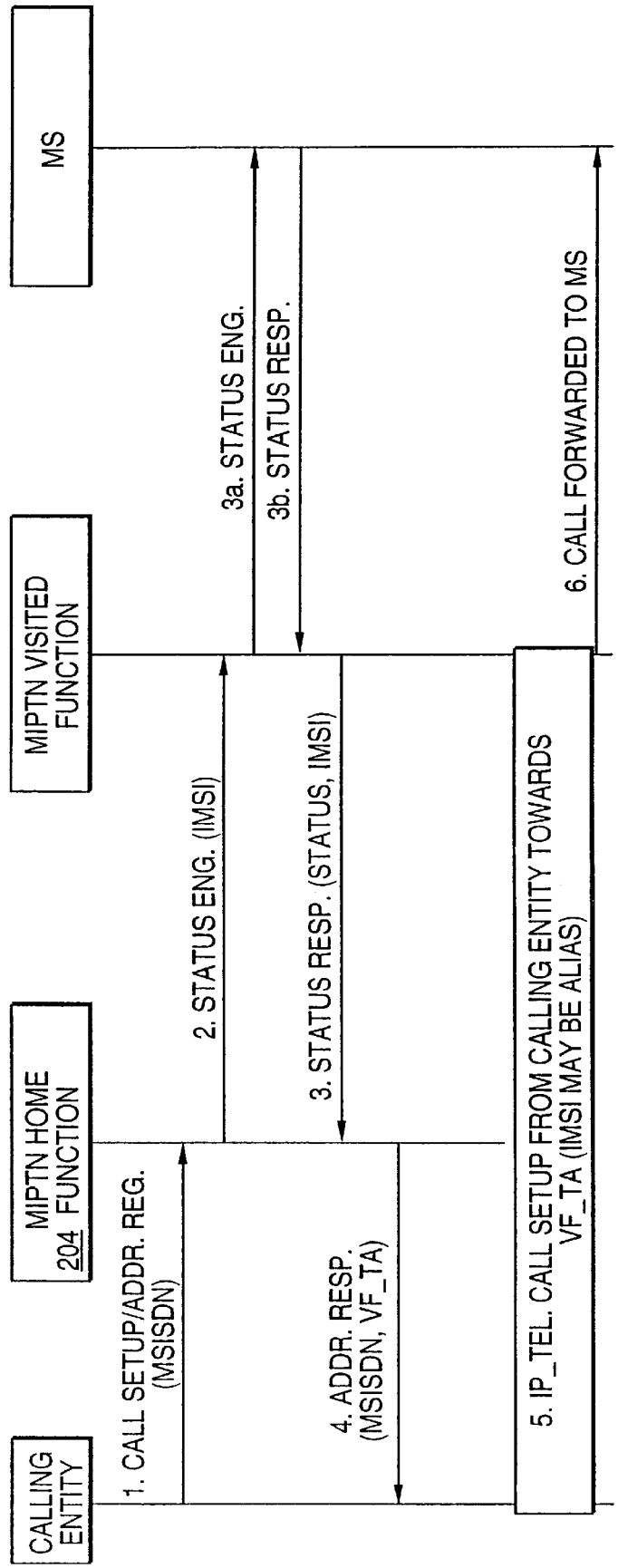
FIG. 9 is a diagram illustrating an example call delivery of an IP-telephony call to a Mobile IP-telephony subscriber roaming in a Mobile IP-telephony network.

FIG. 9 is a diagram illustrating an example call delivery of an IP-telephony call to a Mobile IP-telephony subscriber roaming in the Mobile IP-telephony network. In FIG. 9, it is assumed that a MIPTN subscriber has contacted a MIPTN Visited Function to perform registration (e.g., see FIG. 6 for the registration process). At step 1 of FIG. 9, the calling entity sends a call setup/address request message to the MIPTN Home Function 204, and provides the MSISDN of the called subscriber. The MIPTN Home Function stores a static table identifying the correspondence between IMSI and MSISDN for each subscriber. The MIPTN Home Function 204 translates the MSISDN to the corresponding IMSI for the subscriber.

In some cases it may be necessary for the Home Function 204 to determine if the subscriber terminal is presently available to receive the requested call. An example is where the subscriber terminal is a cellular terminal connected to a Visited Function, and the Home Function must ensure that the subscriber terminal has not temporarily passed under a building or bridge, lost power, etc. Such a status enquiry may not be necessary for some types of subscriber terminals, which are not subject to interference, etc. (such as an ISDN terminal or IP-telephony terminal).

Steps 2–3 in FIG. 9 are performed to check the status of the subscriber terminal. In step 2, the Home Function sends a status enquiry message to the serving MIPTN Visited Function where the subscriber terminal is registered. The IP address of the serving Visited Function was obtained and stored by the Home Function 204 during registration. In the case where the subscriber terminal is separate from the Visited Function, the Visited Function queries the subscriber terminal to obtain the terminal's status (steps 3a and 3b). The Visited Function then forwards the status of the terminal (e.g., able to receive a call, or unable to receive a call) back to the Home Function 204, step 3 of FIG. 9.

At step 4 of FIG. 9, if the terminal is able to receive the call, the Home Function 204 returns an address response message to the calling entity, providing the address (e.g., VF__TA or CCEVF__TA) of the Visited Function where the IP-telephony call should be forwarded. If the subscriber terminal is unavailable, the returned address response message may indicate the subscriber terminal is unavailable and return an IP address of a voice mail box, etc.

At step 5 of FIG. 9, the calling entity sets up or establishes an IP-telephony call from the calling entity towards the IP address of the MIPTN Visited Function (including call signaling for call setup and then providing the call media or voice). The subscriber's IMSI may be provided as an alias if needed to identify the called subscriber. Call signaling could be sent to the Visited Function at the CCEVF__TA address, while the Visited Function address for sending the RTP media (RTP__TA) could be negotiated separately by the Visited Function and calling entity.

At step 6 of FIG. 9, if the subscriber terminal is separate from the Visited Function, the Visited Function would then forward the call over the medium or interface used by the subscriber terminal (e.g., ISDN, wireless or cellular). If the subscriber terminal is connected to the Visited Function via IP-telephony, the IP-telephony call could just be forwarded from the Visited Function to the address of the subscriber terminal (or set up directly to the subscriber terminal). In the event that the Visited Function is provided as a part of the subscriber terminal, step 6 is unnecessary.

The are two ways in which an IP-telephony call may be setup or negotiated. One way (which is illustrated in FIG. 9) is where call control signaling is routed directly between the calling entity and the Visited Function. A second way is to route all call control signaling between the calling entity and the Visited Function through the Home Function. This second technique allows the Home Function 204 to keep track of the identification of the call parties, when the call was started and ended, etc., which can be used for billing or other administrative processes. In this technique (where signaling is routed through the Home Function, the calling entity need not receive the VF__TA. During call setup, the parties could negotiate the Visited Function address for transporting the IP-telephony call media (RTP__TA) if separate signaling and media addresses are used at the Visited Function. Regardless whether the call control signaling is sent through the Home Function, the IP-telephony call media (i.e., packetized voice) should be sent directly between the two parties (the IP-telephony media is not routed through the MIPTN Home Function).

Figure 10:
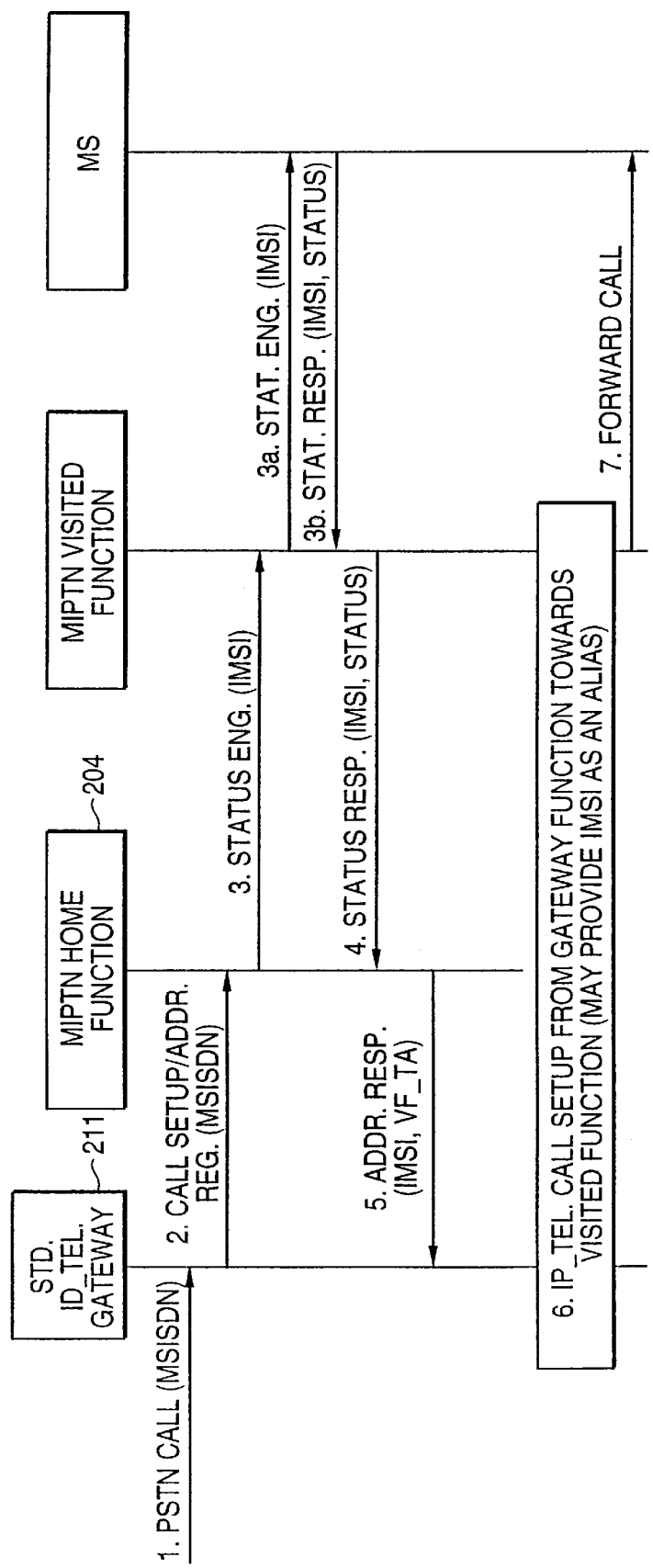
FIG. 10 is a diagram illustrating an example delivery of a PSTN call to a Mobile IP-telephony subscriber roaming in the Mobile IP-telephony network.

FIG. 10 is a diagram illustrating an example delivery of a PSTN call to a Mobile IP-telephony subscriber roaming in the Mobile IP-telephony network. It is assumed in FIG. 10 that the MIPTN subscriber has already contacted a MIPTN Visited Function to perform registration. The call delivery of a PSTN call to a MIPTN subscriber roaming in the MIPTN 202 is similar to the call delivery of a MIPTN call (shown in FIG. 9). It is not necessary to use Gateway Function 210 here (Gateway 211 will suffice) because this is not internetwork roaming (rather, FIG. 10 involves roaming within MIPTN 202).

At step 1 of FIG. 10, a PSTN call is directed to a standard IP-telephony Gateway 211 based on the called subscriber's MSISDN. The standard IP-telephony Gateway 211 performs a static translation between each subscriber's MSISDN and the transport address of the subscriber's Home Function 204, HF__TA (e.g.,IP address and port number of Home Function 204). The standard IP-telephony Gateway 211 sends a call setup/address request message to the MIPTN Home Function 204, providing the called subscriber's MSISDN. The MIPTN Home Function 204 stores a static correspondence between each subscriber's IMSI and MSISDN, and stores a dynamic correspondence between the subscriber's IMSI and the subscriber's updated location (the latter obtained during registration). In this case, the subscriber's location is the IP address (e.g., VF__TA) of the Visited Function where the subscriber terminal is registered. After obtaining the subscriber's status (if necessary) at steps 3–4 of FIG. 10, the MIPTN Home Function 204 may then send an address response message at step 5, providing the address of the MIPTN Visited Function where the subscriber is registered and can be reached (e.g., the VF__TA where one address used and the CCEVF__TA where separate signaling and media addresses are used). As in FIG. 9, the signaling may be either routed directly between the standard IP-telephony Gateway 211 and the MIPTN Visited Function, or through the MIPTN Home Function 204. Note also that in the response messages (i.e., messages of steps 3b, 4 and 5 of FIG. 10) in the Figures, it is not always necessary to provide the IMSI because identifiers are typically used to correlate a response to a particular request (thus, the IMSI being implicitly provided).

At step 6 of FIG. 10, an IP-telephony call is set up from the Gateway Function towards the address of the MIPTN Visited Function (with the media sent to either VF__TA or RTP__TA address of the MIPTN Visited Function). As noted above, the IP-telephony call may use the IMSI as an alias if needed by the Visited Function to distinguish between multiple subscriber terminals. If the subscriber terminal and MIPTN Visited Function are separate, the MIPTN Visited Function then forwards the received call to the subscriber terminal over the medium used by the subscriber terminal, step 7.

Figure 11:
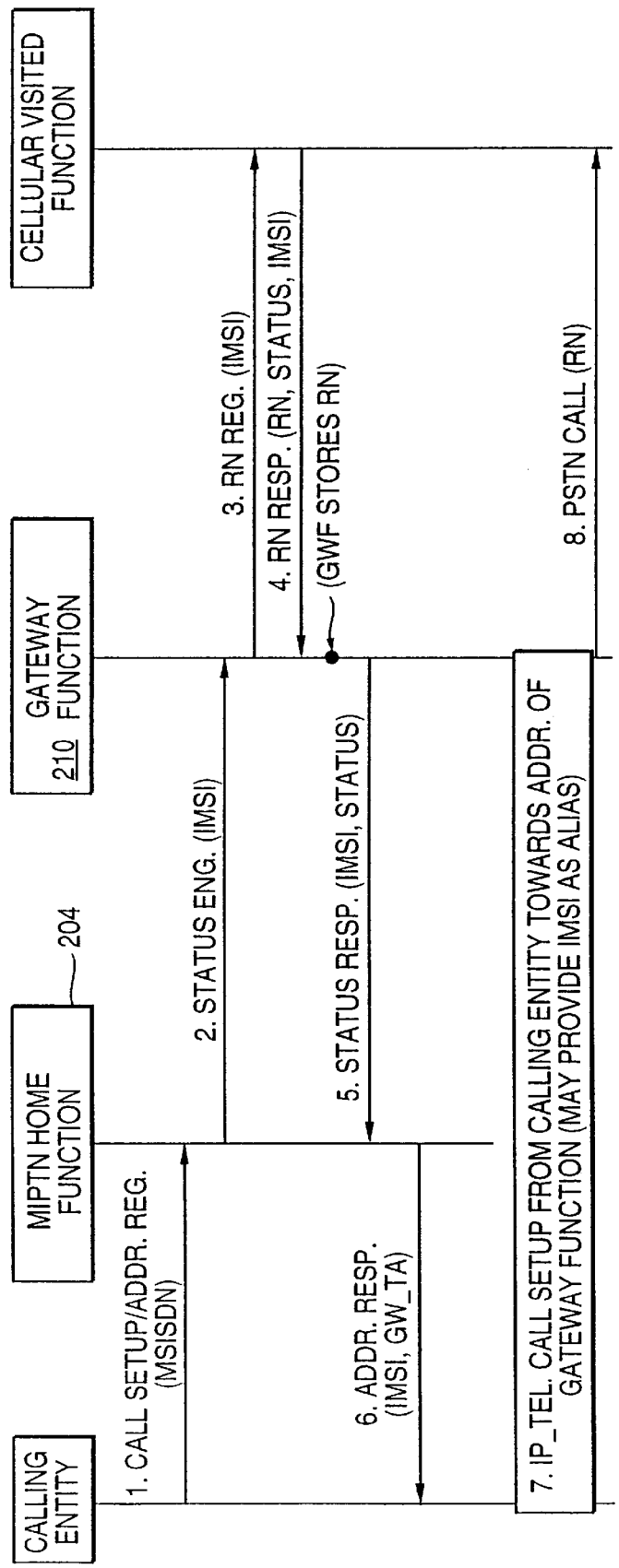
FIG. 11 is a diagram illustrating an example delivery of an IP-telephony call to a Mobile IP-telephony subscriber roaming to a cellular network.
Figure 12:
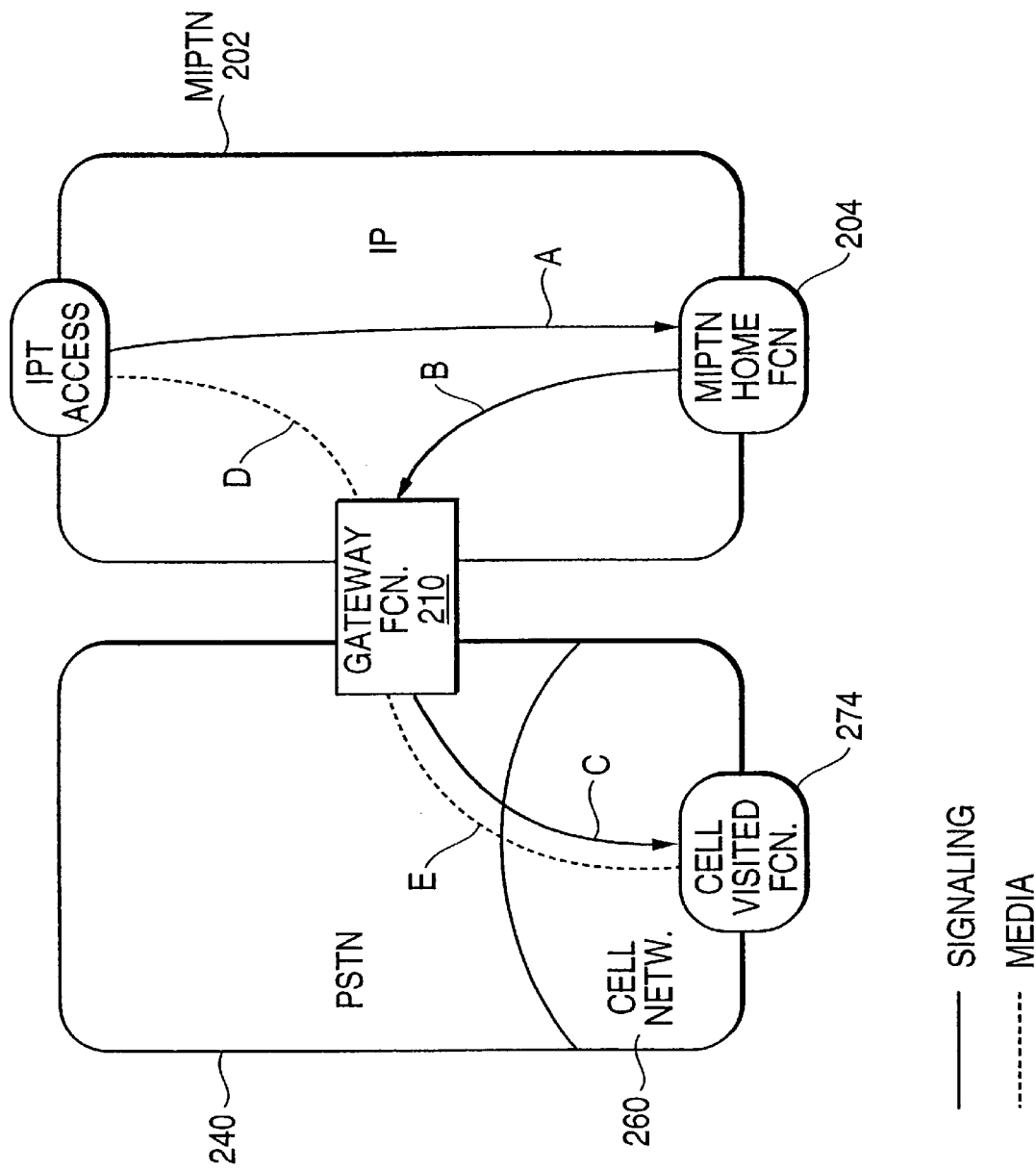
FIG. 12 is a block diagram illustrating an example delivery of an IP-telephony call to a Mobile IP-telephony subscriber roaming to a cellular network, corresponding to FIG. 11.

FIG. 11 is a diagram illustrating an example delivery of an IP-telephony call to a Mobile IP-telephony subscriber roaming to a cellular network. FIG. 12 is a block diagram illustrating an example delivery of an IP-telephony call to a Mobile IP-telephony subscriber roaming to a cellular network, corresponding to FIG. 11. In FIGS. 11 and 12, it is assumed that the MIPTN subscriber has already contacted a serving cellular Visited Function 274 (e.g., serving VLR 270, FIG. 2) to register as described in FIG. 7. As part of the registration process for the MIPTN subscriber that has roamed to the cellular network 260, the Gateway Function 210 has stored a dynamic correspondence between the subscriber's IMSI and the VLR number (e.g., in E.164 format) that identifies the serving VLR in the cellular network where the subscriber is located (where subscriber has registered), as described with reference to FIG. 7. As always, the subscriber's Home Function 204 has stored the transport address where the subscriber can be reached. In this case, because the subscriber has roamed to the cellular network 260, the subscriber's location information in the Home Function 204 identifies the IP address of the Gateway Function 210 (i.e., the GW_TA).

At step 1 of FIG. 11, the calling entity sends a call setup/address request message to the subscriber's Home Function based on the MSISDN, providing the called subscriber's MSISDN. This step is an example of the signaling provided on signaling leg A in FIG. 12. (As noted above, in the MIPTN 202, the MIPTN subscriber's MSISDN points toward the subscriber's MIPTN Home Function 204).

The Home Function 204 stores a static correspondence between the subscriber's MSISDN and IMSI. The Home Function identifies the IMSI corresponding to the MSISDN, and then sends a status enquiry message to the Gateway Function using the stored GW_TA corresponding to the called subscriber's IMSI (from the dynamic mapping), providing the IMSI, step 2. This step is an example of the signaling provided at leg B on FIG. 12.

The Gateway Function 210 receives the status enquiry message (including the called subscriber's IMSI), and identifies the VLR number (identifying the serving VLR or cellular Visited Function where the subscriber has registered) corresponding to the subscriber IMSI (using the dynamic mapping obtained during registration). At step 3 of FIG. 11, the Gateway Function 210 sends a Route Number (RN) request message as a cellular procedure or message (including the called subscriber's IMSI) to the identified VLR number (i.e., to the cellular Visited Function where the called subscriber has registered). The message of step 3 is an example of the signaling provided on signaling leg C of FIG. 12.

The cellular Visited Function 274 then determines the status of the called subscriber. If the called subscriber is reachable or able to receive the call, the cellular Visited Function 274 assigns a roaming number (RN) to the subscriber. At step 4 of Fig. 11, the cellular Visited Function 274 then sends a RN response message back to the Gateway Function, including the roaming number assigned to the called subscriber (if the subscriber is reachable). Step 4 of FIG. 11 is another example of the signaling provided on leg C of FIG. 12. (Although the arrows on FIG. 12 are shown in one direction to show an initial direction, it should be understood that one or more of the legs in FIG. 12 provide bidirectional signals for each leg). If the subscriber is unreachable or unable to receive the call, no RN is assigned or returned to the Gateway Function 210.

The Gateway Function 210 receives the RN response message, and stores the dynamic correspondence between the subscriber's IMSI and the Roaming Number (RN) assigned to the subscriber. At step 5 of FIG. 11, the Gateway Function 210 sends a status response message to the MIPTN Home Function 204, providing the status of the called subscriber. The message of step 5 is another example of the signaling provided on leg B of FIG. 12.

At step 6 of FIG. 11, the MIPTN Home Function 204 sends an address response back to the calling entity, providing the transport address (GW_TA) of the Gateway Function 210, where the called subscriber can be reached in the MIPTN 202. The message of Step 6 of FIG. 11 is another example of the signaling provided on leg A of FIG. 12.

At step 7 of FIG. 11, the calling entity sets up or establishes an IP-telephony call towards the address (GW_TA) of the Gateway Function 210, and may provide the called subscriber's IMSI as an alias if necessary (or a unique transport address assigned to the subscriber for the GW_TA could be used instead). The IP-telephony call of step 7 if FIG. 11 corresponds to media leg D of FIG. 12.

The Gateway Function 210 receives the IP-telephony call, and then forwards the call to the cellular Visited Function 274 as a PSTN call directed towards the RN assigned to the subscriber (i.e., the call is routed to the cellular Visited Function as a PSTN call based upon the subscriber's RN), step 8. The PSTN call of step 8 to the cellular Visited Function corresponds to the media leg E of FIG. 12. The cellular Visited Function then forwards the call to the subscriber terminal.

Figure 13:
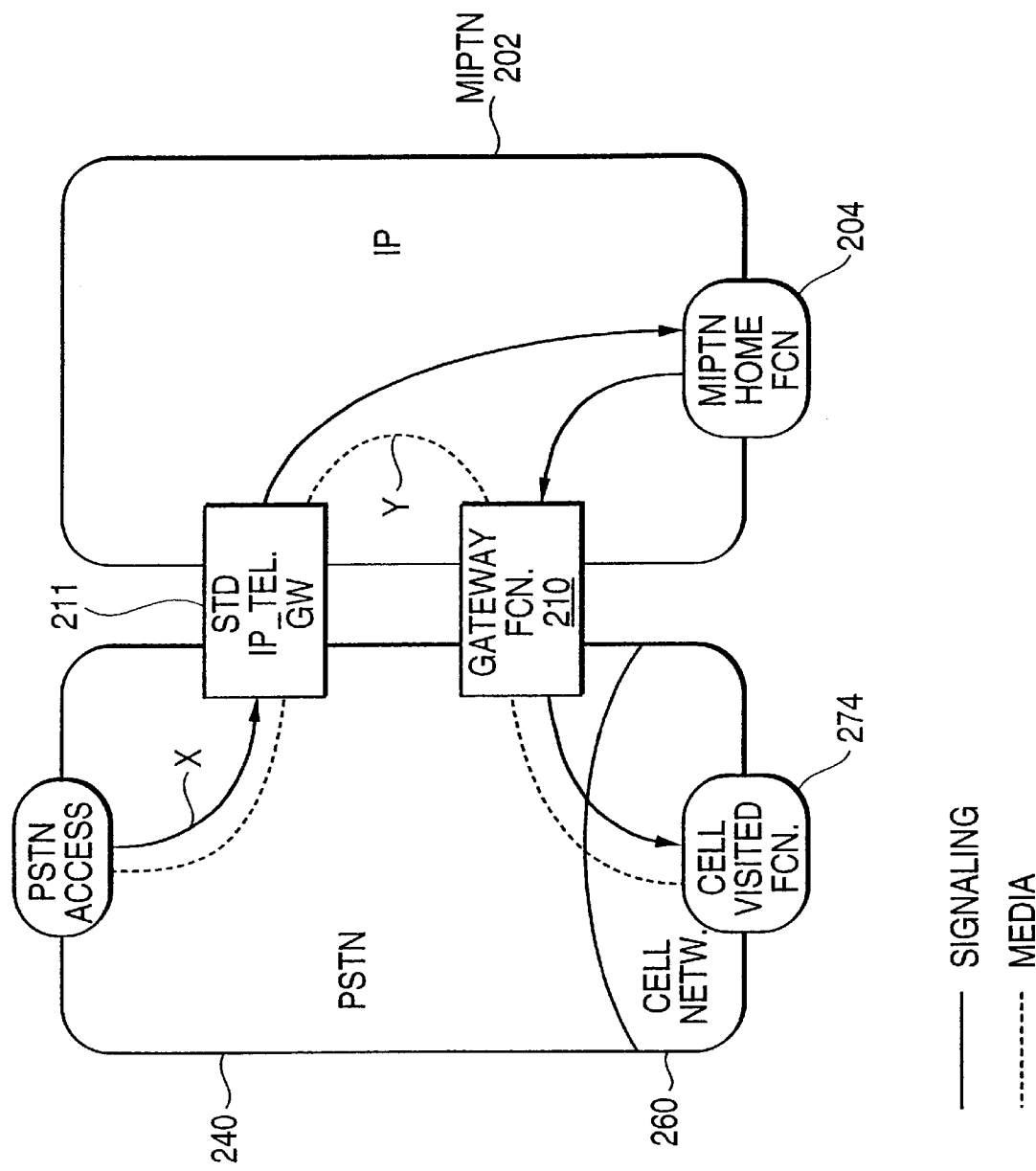
FIG. 13 is a block diagram illustrating an example delivery of a PSTN call to a Mobile IP-telephony subscriber roaming to a cellular network.

FIG. 13 is a block diagram illustrating an example delivery of a PSTN call to a Mobile IP-telephony subscriber roaming to a cellular network. The call delivery in FIG. 13 is very similar to that of FIGS. 11 and 12, with the following differences. The PSTN call is directed to the standard IP-telephony Gateway 211 at leg X, which is a standard IP-telephony gateway having no mobility support. The standard IP-telephony Gateway 211 then takes the place of the calling entity in FIG. 11. The standard IP-telephony Gateway 211 statically translates the MSISDN to obtain the IP address of the MIPTN Home Function 204. The standard IP-telephony Gateway 211 then queries the Home Function 204 to obtain the IP address where the subscriber can be reached, which is the IP address of the Gateway Function 210. The media of the call is then routed through the Gateway Function 210 to the cellular Visited Function 274. The remaining steps are the same as FIGS. 11 and 12.

There are three ways in which the functionality of Gateway Function 210 and standard IP-telephony Gateway 211 can be provided in FIG. 13. First, a Gateway Function 210 and standard IP-telephony Gateway 211 can be used as shown in FIG. 13. Second, the function of the standard IP-telephony Gateway 211 can also be provided by the Gateway Function 210 (which also has mobility support, such as dynamic mapping which is not provided in gateway 211). In this second embodiment, there would only be one Gateway used (i.e., Gateway Function 210) because standard IP-telephony Gateway 211 is now unnecessary. In a third embodiment, two Gateway Functions 210 would be used (one Gateway Function 210 replacing the Gateway 211 in FIG. 13).

Figure 14:
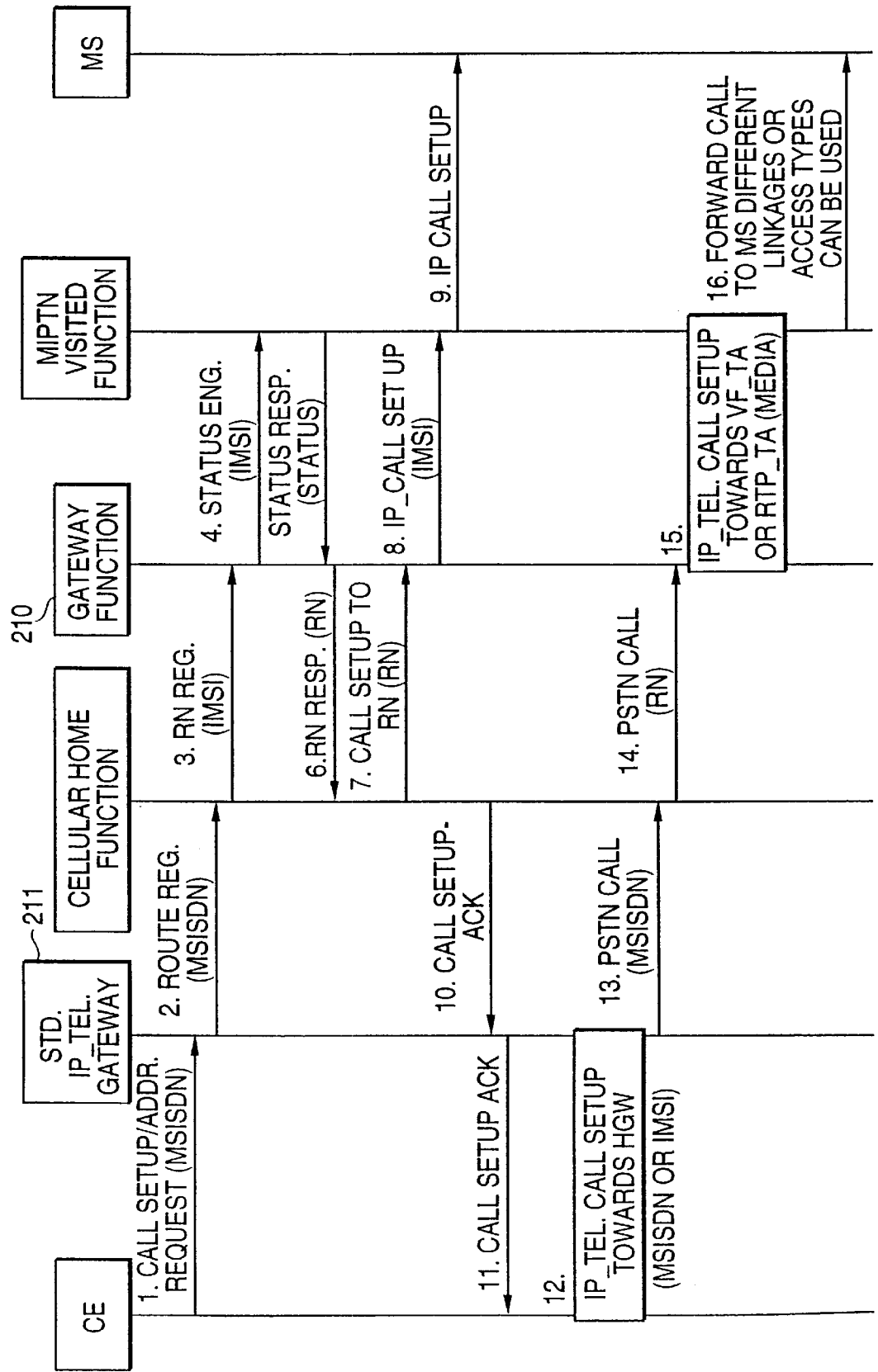
FIG. 14 is a diagram illustrating an example delivery of an IP-telephony call to a mobile cellular network subscriber roaming to an IP-telephony network.
Figure 15:
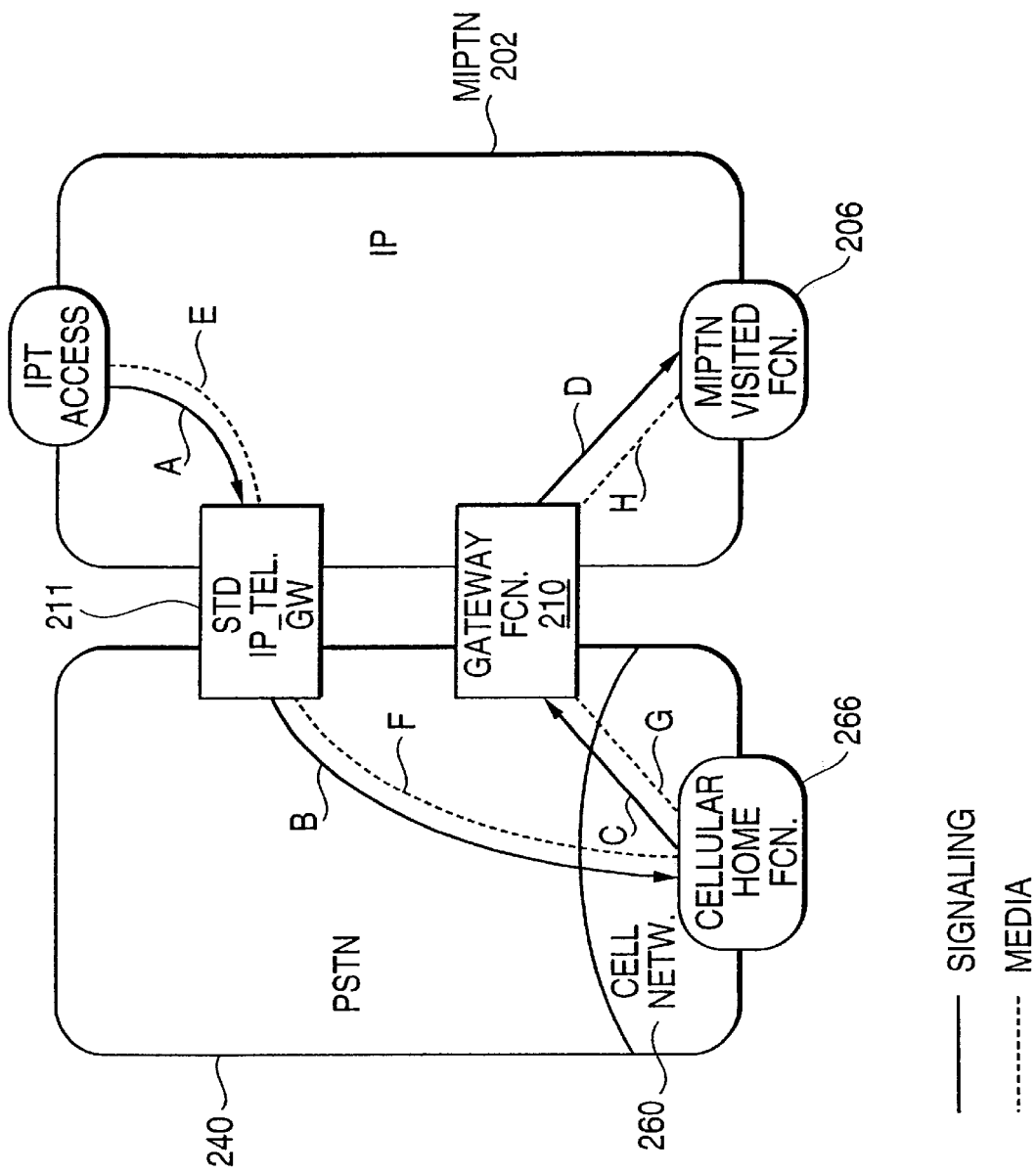
FIG. 15 is a block diagram illustrating an example delivery of an IP-telephony call to a mobile cellular network subscriber roaming to an IP-telephony network, corresponding to FIG. 14

FIG. 14 is a diagram illustrating an example delivery of an IP-telephony call to a mobile cellular network subscriber roaming to an IP-telephony network. FIG. 15 is a block diagram illustrating an example delivery of an IP-telephony call to a mobile cellular network subscriber roaming to an IP-telephony network, corresponding to FIG. 14. In FIGS. 14 and 15, it is assumed that the cellular subscriber has already contacted a serving MIPTN Visited Function 206 to register as described in FIG. 8. As part of the registration, the Gateway Function 210 has stored a dynamic correspondence between the called subscriber's IMSI and the transport address of the MIPTN Visited Function where the subscriber has registered (i.e., where the subscriber is located). The subscriber's cellular Home Function (i.e., HLR 264) also has stored the Gateway Function number of Gateway Function 210 (in E.164 format or other telephony/PSTN format) corresponding to the IMSI.

In step 1 of FIG. 14, a call setup/address request message is routed as an IP-telephony message or procedure from the calling entity to the standard IP-telephony Gateway 211 (or alternatively, to the Gateway Function 210), based on the dialed MSISDN. The message of step 1 corresponds to signaling leg A of FIG. 15.

The standard IP-telephony Gateway 211 receives the call setup message/address request. The MSISDN in the call setup message identifies a cellular subscriber. Therefore, the subscriber's MSISDN points to the cellular Home Function 266 (i.e., MSISDN points to HLR 264/GW MSC 262). Thus, at step 2 of FIG. 14, the standard IP-telephony Gateway 211 sends a route request message to the cellular Home Function 204 based on the MSISDN, providing the called subscriber's MSISDN (or other subscriber identification or subscriber ID). The message of step 2 is an example of the signaling provided on leg B of FIG. 15.

The cellular Home Function 266 receives the Route request message. The GW MSC 262 (of the cellular Home Function 266) then queries or interrogates the HLR 264 to obtain the current location information for the called subscriber. The HLR 264 returns the Gateway Function number of Gateway Function 210 (in E.164 format), where the subscriber can be reached. Cellular Home Function also identifies the IMSI corresponding to the MSISDN. At step 3 of FIG. 14, the cellular Home Function 266 sends a roaming number (RN) request message to the Gateway Function 210, providing the called subscriber's IMSI. The message of step 3 (FIG. 14) is an example of the signaling provided on leg C of FIG. 15.

The Gateway Function 210 receives the RN request message, including the IMSI. From registration, the Gateway Function 210 stores a correspondence between the subscriber's IMSI and the transport address of the Visited Function where the subscriber can be reached (e.g., VF_TA or CCEVF_TA). At step 4 of FIG. 14, the Gateway Function 210 sends a status enquiry message to the MIPTN Visited Function 206 (if necessary), and receives a status response at step 5. The MIPTN Visited Function may similarly send a status enquiry message to the called subscriber terminal, and receive a status response therefrom. The messages of steps 4 and 5 (FIG. 14) are examples of the signaling provided on leg D of FIG. 15.

The Gateway Function 210 receives the status response message of step 5 of FIG. 14. If the subscriber terminal is reachable or able to receive the call, the Gateway Function 210 assigns a roaming number (RN) to the subscriber terminal, and stores the correspondence between the IMSI and RN. (The Gateway Function has already stored the correspondence between the IMSI and the VF_TA where the subscriber is registered or located). At step 6 of FIG. 14, the Gateway Function sends a RN response message to the cellular Home Function 266, providing the RN assigned to the called subscriber. The message of step 6 is an example of the signaling of leg C of FIG. 15.

Steps 7–11 of FIG. 14 will be briefly explained, and provide additional examples of call control signaling. At step 7 of FIG. 14, the cellular Home Function 266 sends a call setup message to the Gateway Function 210, based on the RN (i.e., message is routed to Gateway Function 210 based on the RN). The Gateway Function 210 uses the dynamic correspondence tables to identify the IMSI corresponding to the RN, and then identify the transport address of the MIPTN Visited Function (e.g., VF_TA or CCEVF_TA) corresponding to the IMSI. At step 8 of FIG. 14, the Gateway Function then sends a call setup message to the VF_TA(or to the CCEVF_TA), providing the IMSI as an alias. At step 9 of FIG. 14, the MIPTN Visited Function sends a call setup message to the subscriber terminal (MS), over whatever linkage or type of access that is used by the subscriber terminal(e.g., IP-telephony, ISDN, radio or cellular). There would be acknowledgments to each of messages of steps 7, 8 and 9, but are not shown. At step 10 of FIG. 14, the cellular Home Function sends an acknowledgment for call setup back to the standard Gateway 211, which in turn also issues an acknowledgment at step 11. The messages of steps 7–11 are simply examples of the types of signaling which may occur between the entities.

At step 12 of FIG. 14, the calling entity sets up an IP-telephony call towards the standard IP-telephony Gateway 211, and may provide the called subscriber's MSISDN as an alias. The call of step 12 (FIG. 14) corresponds to the call provided on leg E of FIG. 15. At step 13 of FIG. 14, the standard IP-telephony Gateway 211 forwards the call as PSTN call based on the MSISDN to the cellular Home Function 266 (i.e., the call is routed to the GW MSC 262). The call of step 13 (FIG. 14) corresponds to the call of leg F in FIG. 15.

At step 14 of FIG. 14, the cellular Home Function 266 identifies the IMSI corresponding to the MSISDN (static correspondence), and then identifies the RN corresponding to the IMSI (dynamic correspondence). The cellular Home Function 266 (in particular, the GW MSC 262) then forwards the call as a PSTN call to the Gateway Function 210 based on the RN assigned to the subscriber. The call of step 14 (FIG. 14) corresponds to leg G of FIG. 15.

At step 15 of FIG. 14, the Gateway Function 210 identifies the IMSI corresponding to the RN, and then identifies the VF_TA (or CCEVF_TA) corresponding to the IMSI (both are dynamic). The Gateway Function 210 then sets up an IP-telephony call towards the address of the MIPTN Visited Function where the subscriber is located (where subscriber is registered). As part of the IP-telephony call setup, the parties may negotiate the address at the Visited Function that will receive the voice media (i.e., packetized voice). This transport address of the MIPTN Visited Function may be referred to herein as, for example, the RTP_TA (or the VF_TA if one address is used for signaling and media). This IP-telephony call of step 15 (FIG. 14) corresponds to media leg H of FIG. 15.

At step 16 of FIG. 14, the MIPTN Visited Function forwards the received call to the subscriber terminal (if Visited Function is separate from the subscriber terminal). The call can be forwarded to the subscriber over whatever linkage or type of access that the subscriber terminal is using, such as IP-telephony call, an ISDN call, a cellular call, etc. Steps 12–16 may be performed in an order other than what is shown in FIG. 14.

In an alternative embodiment, only one Gateway is used (Gateway Function 210), because Gateway Function 210 can also perform the functions of the standard IP-telephony Gateway 211. Thus, replacing the standard IP-telephony Gateway 211 and the Gateway Function 210 in FIG. 15 with a single Gateway Function 210 can simplify call delivery.

Figure 16:
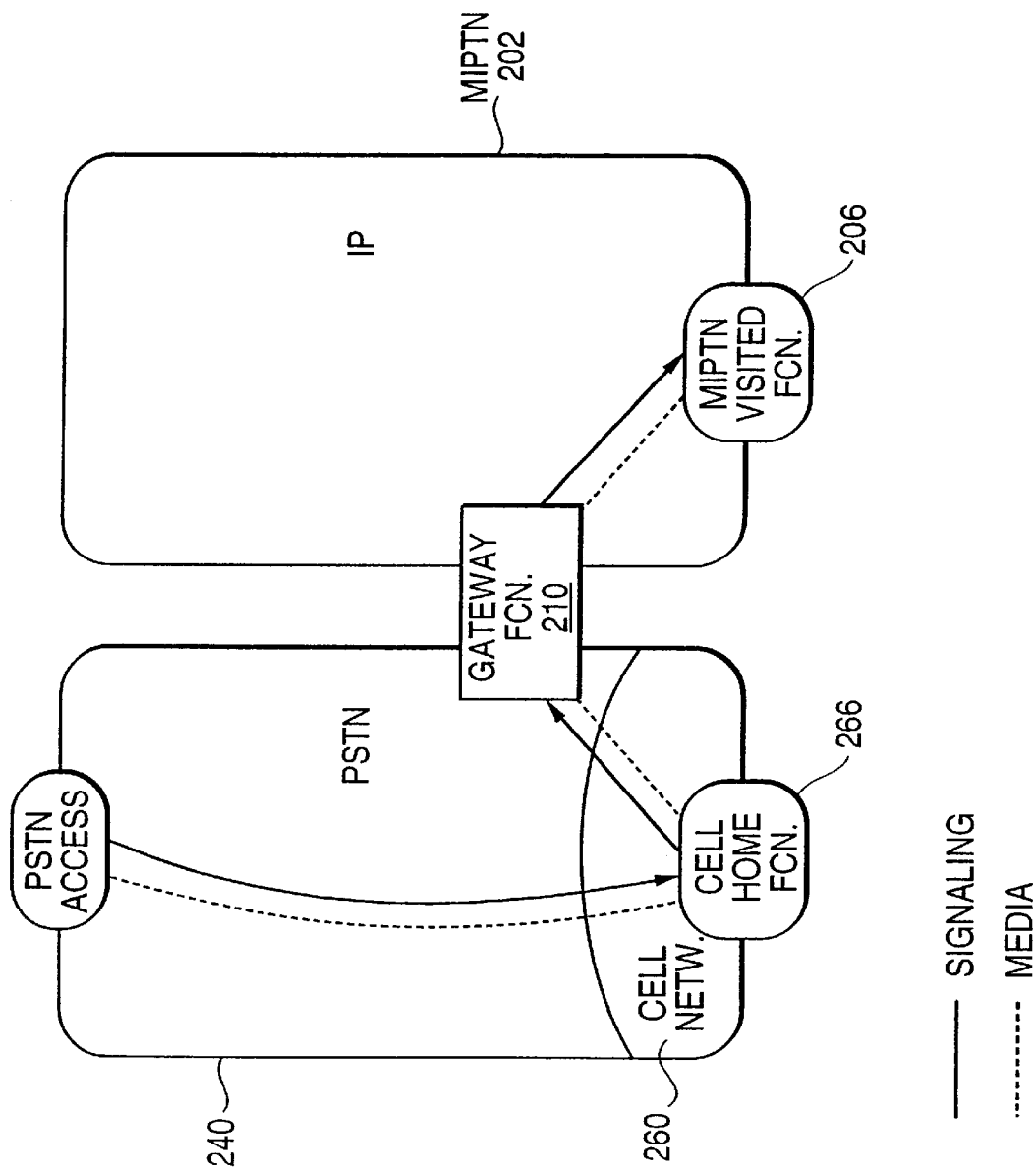
FIG. 16 is a block diagram illustrating an example delivery of a PSTN call to a mobile cellular network subscriber roaming to an IP-telephony network.

FIG. 16 is a block diagram illustrating an example delivery of a PSTN call to a mobile cellular network subscriber roaming to an IP-telephony network. The delivery of a PSTN call to a cellular subscriber that is roaming in the MIPTN 202 (FIG. 16) is very similar to the delivery of a IP-telephony call to a cellular subscriber that is roaming in the IP-telephony network (FIGS. 14 and 15). Referring to FIG. 16, the PSTN call is routed based on the dialed MSISDN to the cellular Home Function 266 directly (rather than through a Gateway). The structure and operation of the remainder of FIG. 16 is similar to the call delivery steps illustrated in FIGS. 14 and 15.

Short Message Service (SMS)

As provided in GSM, Short Message Service (SMS) gives mobile phone subscribers the ability to send and receive short text messages. Short messages usually contain about one page of text or less. Some systems limit the short message to 160 alphanumeric characters. However, there is presently no provision for providing short messages over an IP-telephony network, or to subscribers roaming between a cellular network and an IP-telephony network. The present invention includes features for delivering short messages over an IP-telephony network (e.g., over MIPTN 202), and for delivering short messages to subscribers roaming between cellular network 260 and MIPTN 202.

Figure 17:
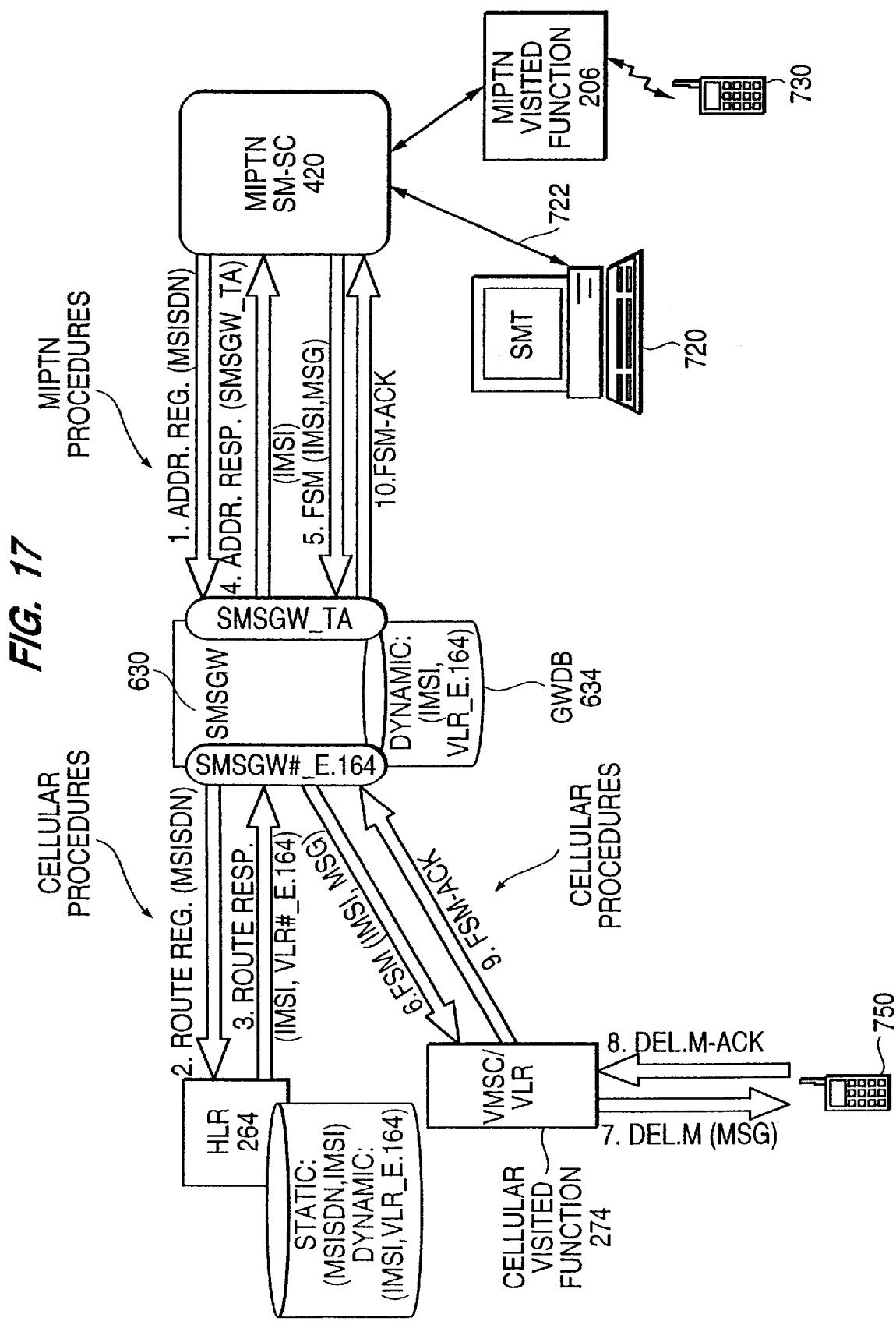
FIG. 17 is a diagram illustrating an example delivery of a short message from a IP-telephony short message service center to a mobile cellular network subscriber that is roaming within the cellular network.

FIG. 17 is a diagram illustrating an example delivery of a short message from a IP-telephony short message service center to a mobile cellular network subscriber that is roaming within the cellular network. FIG. 17 assumes that the cellular network subscriber has already registered with the serving cellular Visited Function. A message can be generated from a short message terminal (SMT) 720 or other computer or terminal. The message from the SMT 720 is delivered over line 722 to the MIPTN Short Message Service center (SMSC) 420, along with an alias identifying the destination or target subscriber, such as a MSISDN (or other subscriber identification). Alternatively, the short message can be generated and provided from a subscriber terminal (either a MIPTN subscriber or a cellular subscriber) that is registered with MIPTN Visited Function 206. In such case, the MIPTN Visited Function 206 forwards the short message and the MSISDN (or other subscriber identification) that identifies the target or destination subscriber for the message. Because the target subscriber is a cellular network subscriber, the subscriber's MSISDN points to a Gateway Function 210 (FIG. 5). The SMSC 420 sends an address request message to the SMS GW 630 of the Gateway Function 210, including the MSISDN of the target subscriber. The address request message of step 1 is directed to the SMS GW630 because it is signaling for a short message.

In the cellular network 260, the cellular subscriber's MSISDN points to the cellular Home Function 266 (e.g., HLR 264). Based on the MSISDN, the SMS GW 630 sends a route request message at step 2 of FIG. 17 as a cellular procedure or message to the HLR 264, based on the MSISDN, providing the MSISDN.

The HLR 264 stores a static correspondence between the subscriber's IMSI and MSISDN, and a dynamic correspondence (from registration) between the subscriber's IMSI and the VLR number (in E.164 format) identifying the serving VLR where the subscriber is located. Thus, the HLR identifies the IMSI corresponding to the MSISDN, and then the VLR number corresponding to the IMSI of the destination subscriber. At step 3 of FIG. 18, the HLR sends a route response message to the SMS GW 630, providing the IMSI and VLR number (in E.164 format). The SMS GW also stores the dynamic correspondence between the VLR number and the destination subscriber's IMSI.

At step 4 of FIG. 17, the SMS GW 630 sends an address response message as an IP-telephony message or procedure to SMSC 420, providing the IMSI and the transport address (e.g., IP address and port number) of the SMS GW 630 (SMSGW_TA).

At step 5 of FIG. 17, the SMSC 420 sends a forward short message (FSM) message as an IP-telephony message to SMS GW 630, providing the IMSI of the destination subscriber and the short message (msg).

The SMS GW 630 receives the FSM message of step 5. The SMS GW 630 identifies the VLR number (in E.164 format) corresponding to the IMSI using the dynamic correspondence just stored in response to step 3. Because FIG. 17 involves a cellular subscriber roaming within a cellular network 260, no dynamic correspondence was stored in any Gateway Function 210 during cellular subscriber registration.

At step 6 of FIG. 17, the SMS GW 630 then sends a FSM message as a cellular procedure or message to the identified (serving)VLR number, providing the subscriber's IMSI and the short message.

At step 7 of FIG. 17, the serving VLR then sends a message as a cellular message or procedure to deliver the short message to the destination subscriber terminal 750, where the message can be output on the subscriber terminal 750 (e.g., displayed, printed).

Steps 8–10 of FIG. 17 are acknowledgment messages. At step 8 of FIG. 17, the terminal 750 sends a message back to the serving VLR as an acknowledgment of receiving the short message. At step 9, the serving VLR sends an acknowledgment message back to the SMS GW 630. The SMS GW 630 then deletes the dynamic correspondence between the IMSI and the VLR number from the GWDB 634. At step 10 of FIG. 17, the SMS GW 630 sends an acknowledgment message back to the SMSC 420. The SMSC 420 may also then send an acknowledgment back to the SMT 720 or the Visited Function 206 that sent the short message.

Figure 18:
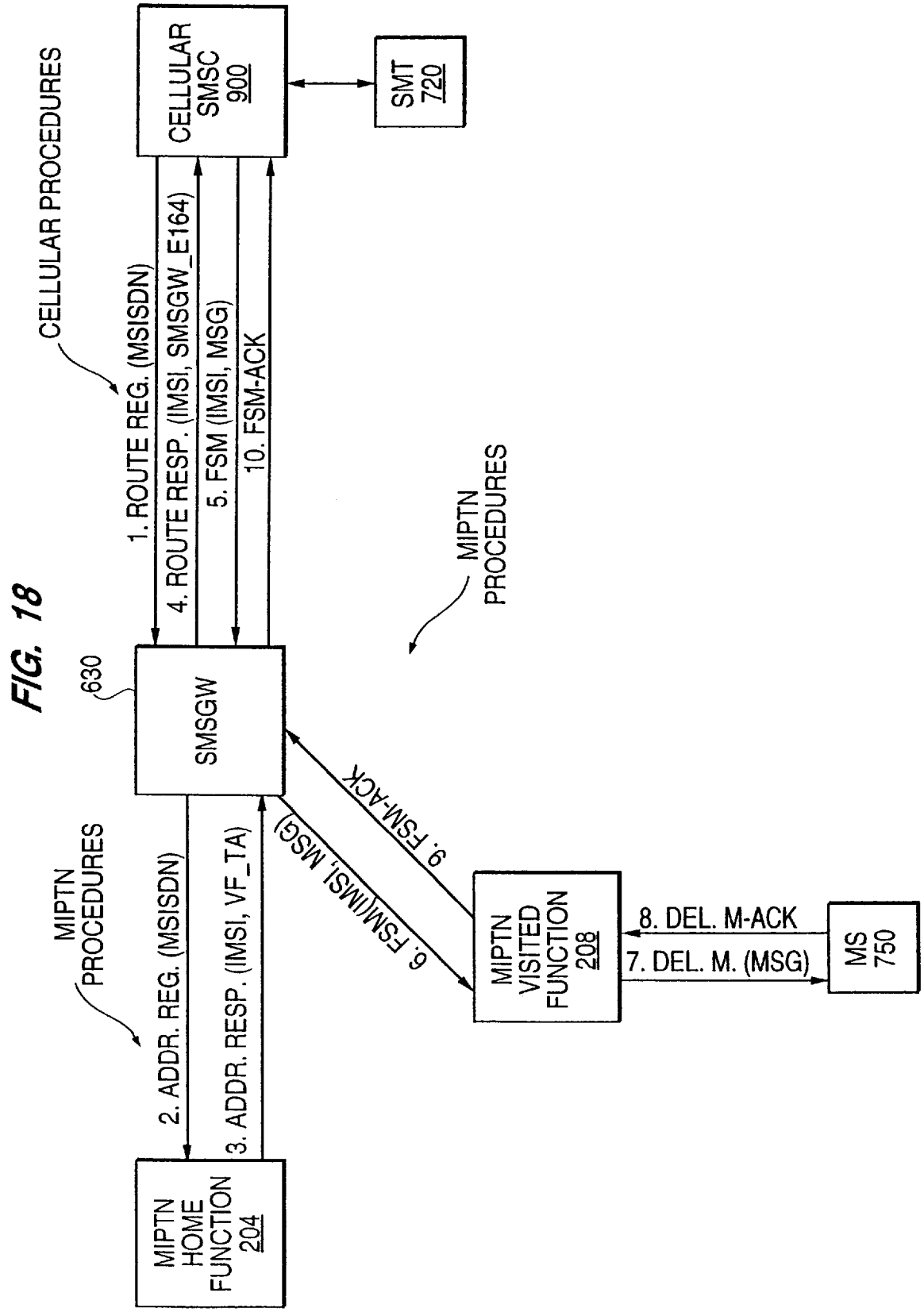
FIG. 18 is a diagram illustrating an example delivery of a short message from a cellular short message service center to a mobile MIPTN subscriber that is roaming within an IP-telephony network.

FIG. 18 is a diagram illustrating an example delivery of a short message from a cellular short message service center to a mobile MIPTN subscriber that is roaming within the MIPTN network. FIG. 18 is symmetric to FIG. 17, but includes a cellular SMSC 900. The cellular SMSC 900 is connected to the cellular network 260and/or the PSTN 240. In FIG. 18, the subscriber's Home Function is a MIPTN Home Function 204, and the subscriber is located at MIPTN visited Function 208. In FIG. 18, the SMSGW 630 obtains the IP address of the Visited Function where the subscriber can be reached, which in this case is a MIPTN Visited Function. The short message is then forwarded to the serving Visited Function 208 for delivery to the subscriber.

Figure 19:
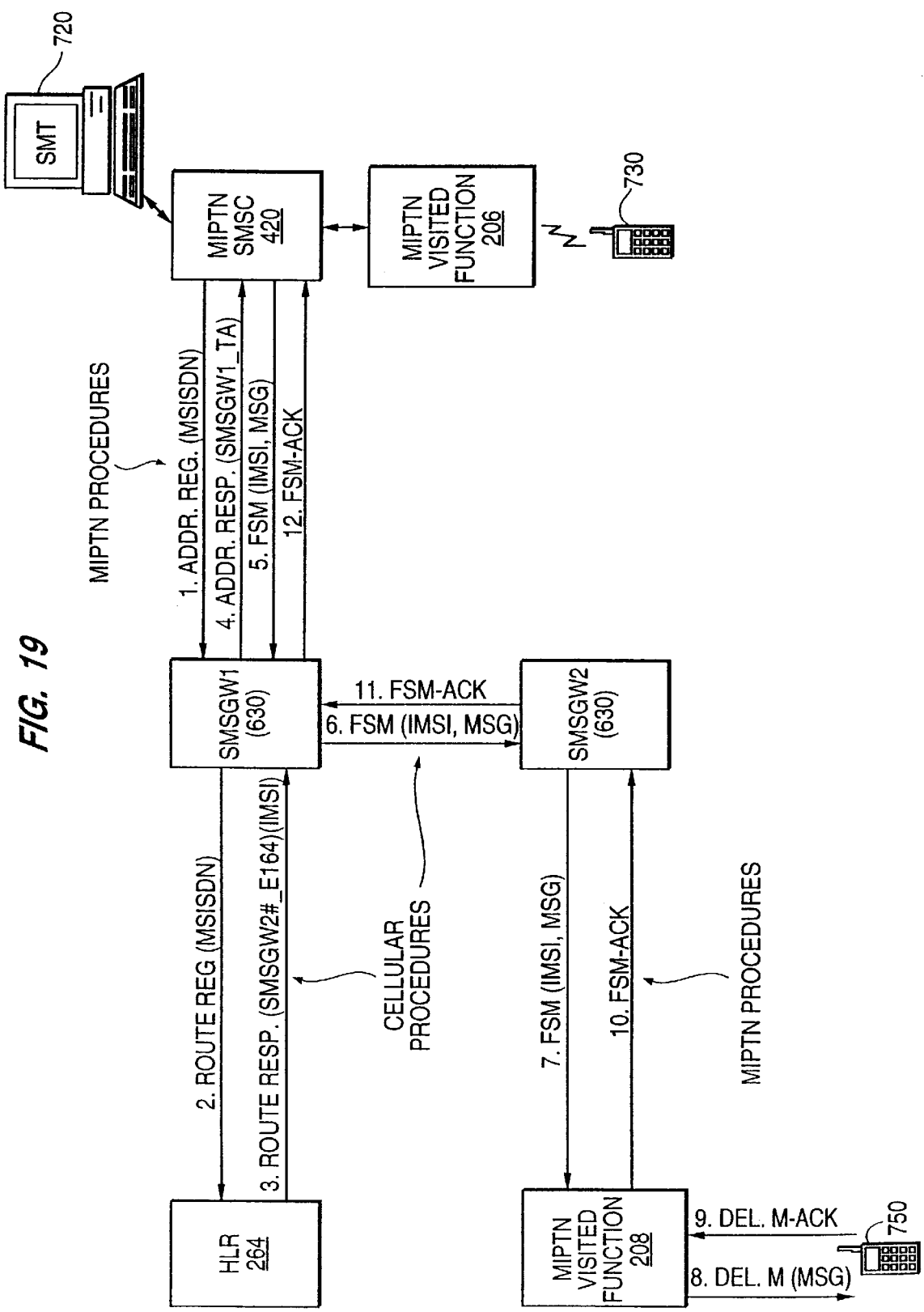
FIG. 19 is a diagram illustrating an example delivery of a short message from an IP-telephony short message service center to a mobile cellular network subscriber that is roaming within the IP-telephony network.
Figure 20:
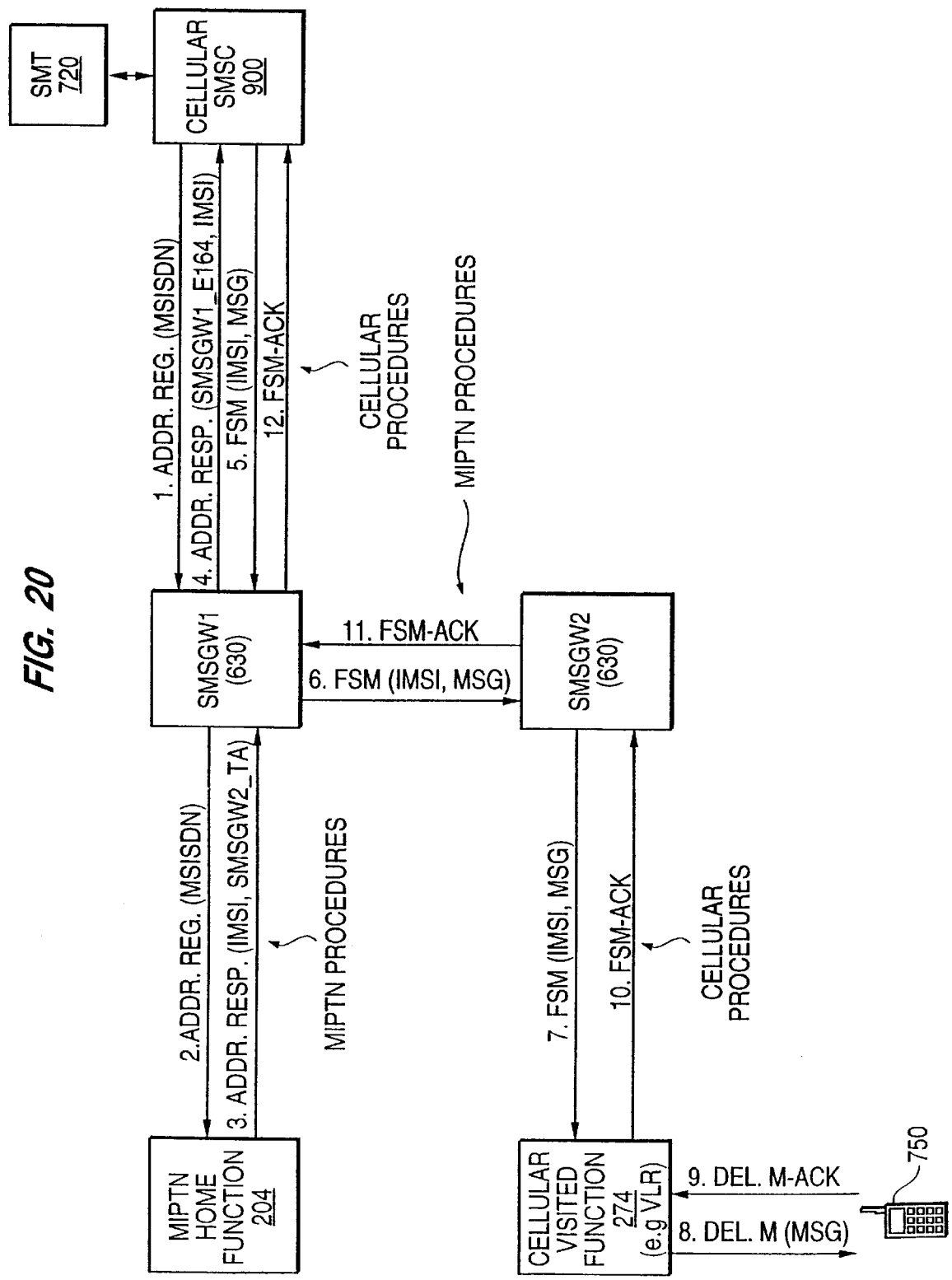
FIG. 20 is a diagram illustrating an example delivery of a short message from a cellular network short message service center to a mobile IP-telephony network subscriber that is roaming within a cellular network.

FIG. 19 is a diagram illustrating an example delivery of a short message from an IP-telephony short message service center to a mobile cellular network subscriber that is roaming within the IP-telephony network. FIG. 20 is a diagram illustrating an example delivery of a short message from a cellular network short message service center to a mobile IP-telephony network subscriber that is roaming within a cellular network. FIGS. 19 and 20 (as with the other message delivery Figures) each assume that the cellular network subscriber has already contacted the appropriate serving Visited Function to perform registration. There may be several Gateway Functions 210 in MIPTN 202. Note that in the examples of FIGS. 19 and 20, there are two SMS Gateways (SMS GW1 630 and SMS GW2 630), each residing within a different Gateway Function 210. As a result, each SMS Gateway also has access to the GWDB 634 in the corresponding Gateway Function 210 where any dynamic mappings are stored during subscriber registrations.

In FIGS. 19 and 20, it is assumed that the Gateway Function 210 corresponding to SMS GW2 performed registration, thereby storing the dynamic mappings (IMSI to Visited Function address). In general, the Gateway Function 210 that was used for subscriber registration or location update will rarely be the same one used for short message delivery. In the examples of FIGS. 19 and 120, the SMS GW that is closest to the Short Message Service Center (SMSC) 420 may be used (i.e., SMS GW1) for short message delivery, while SMS GW2 was used during subscriber registration.

Thus, in the example of FIG. 19, the number (in E.164 format) identifying SMS GW2 is stored in the HLR as the location where the destination subscriber can be reached. SMS GW2 also stores during registration a dynamic mapping between the subscriber's IMSI and the transport address of the MIPTN Visited Function 208 where the subscriber is now located. SMS GW1 does not itself maintain the location information corresponding to the IMSI. As a result, SMS GW1 must forward the short message to the SMS Gateway that was involved in subscriber registration (SMS GW2), so the short message can be delivered to the subscriber.

Referring to FIG. 19, at step 1 the Short SMSC 420 sends an address request message to a SMSGW, such as the closest SMSGW (in this case, SMS GW1). At step 2, the SMS GW1 sends a route request message to the HLR 264, providing the MSISDN (because in the cellular network, the MSISDN points to the HLR 264 for a cellular subscriber).

In response to the route request message of step 2 (FIG. 19), the HLR 264 identifies the location information corresponding to the MSISDN. Thus, at step 3, the HLR sends a route response message to the SMS GW 1, providing the IMSI and the number of the SMS GW2 (in E.164 format) at which the destination subscriber can be reached. The SMS GW1 then stores the correspondence between the IMSI and the number (in E.164 format) of the SMS GW2, where the destination subscriber can be reached.

At step 4 of FIG. 19, the SMS GW1 sends an address response message to the SMSC 420, providing the transport address (or IP address) of the SMS GW1 (e.g., SMSGW1$_{13}$ TA), and the IMSI. At step 5 of FIG. 19, the SMSC then sends a forward short message (FSM) message to the SMS GW1, providing the IMSI and the short message. The SMS GW1 identifies the number corresponding to the IMSI, which is the number of the SMSGW2 (e.g., in E.164 format or other cellular/telephony format). At step 6 of FIG. 18, the SMS GW1 then sends a FSM message to SMSGW2 as a cellular procedure or message (based on the number of the SMSGW2 in E.164 format), providing the IMSI of the target subscriber and the short message.

The SMS GW2 identifies the transport address or IP address where the target subscriber (i.e., corresponding to the IMSI) can be reached, based on information stored during registration. In this case, the IMSI corresponds to the transport address of MIPTN Visited Function 208 (VF208_ TA). At step 7 of FIG. 19, the SMS GW2 sends a FSM message as an IP-telephony message or procedure to MIPTN Visited Function 208 based on the IP address corresponding to the IMSI, providing the IMSI (if necessary) and the message. At step 8, the MIPTN Visited Function then forwards the short message to the target subscriber terminal 760. The messages of steps 9–12 of FIG. 19 are acknowledgments.

FIG. 20 is a diagram illustrating an example delivery of a short message from a cellular network short message service center to a mobile IP-telephony network subscriber that is roaming within a cellular network. Short message delivery of FIG. 20 is symmetric to that of FIG. 19. As in FIG. 19, here in FIG. 20 it is assumed that SMS GW1 is used for short message delivery (but SMS GW1 was not involved in registration of the target or destination subscriber), and SMS GW2 was involved in subscriber registration. In the case of FIG. 20, in the MIPTN 202, the MSISDN points to the MIPTN Home Function 204. Thus, at step 2 of FIG. 20, the SMS GW1 queries the MIPTN Home Function 204 for the subscriber location information corresponding to the MSISDN. In this case, the subscriber location information is the transport address (e.g., IP address) of SMS GW2. This address (SMSGW2_TA) is stored in SMS GW1 as corresponding to the target subscriber's IMSI. Upon receiving the FSM message (including the short message), the SMS GW1 forwards the FSM message including the short message to the SMS GW2 based on this IP address. The SMS GW2 stores the VLR number of the cellular Visited Function (from registration). Thus, at step 7 of FIG. 20, the short message is delivered to the serving cellular Visited Function (e.g., the serving VLR). The short message is then forwarded to the subscriber terminal, step 8.

Figure 21:
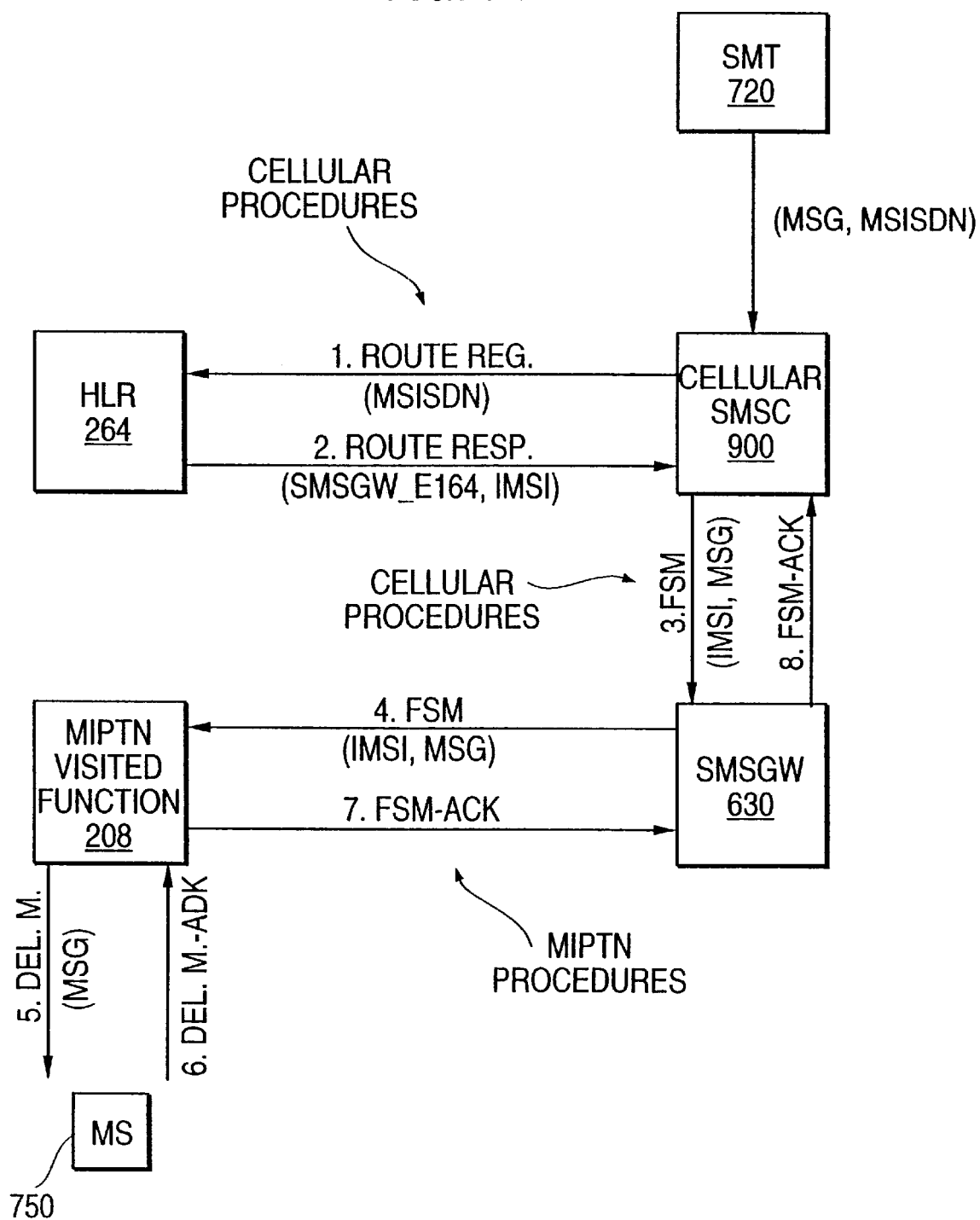
FIG. 21 is a diagram illustrating an example delivery of a short message from a cellular network short message service center to a cellular network subscriber that is roaming within an IP-telephony network.

FIG. 21 is a diagram illustrating an example delivery of a short message from a cellular network short message service center to a cellular network subscriber that is roaming within an IP-telephony network. At steps 1 and 2 of FIG. 21, the cellular SMSC 900 obtains from the cellular Home Function (e.g., the HLR 264) the cellular address where the subscriber can be reached, which in this case, is the cellular address of the SMSGW 630. (Cellular SMSC 900, e.g., is connected to the cellular network 260 and/or PSTN 240). At step 3 of FIG. 21, the short message is forwarded to the SMSGW 630. The SMSGW 630 dynamically translates the subscriber's IMSI to the IP address of the MIPTN Visited Function 208 (where the subscriber is located), based on a dynamic mapping stored in the SMSGW 630 during registration. SMSGW 630 then delivers the short message to the Visited Function 208 for delivery to the subscriber, steps 4 and 5.

Figure 22:
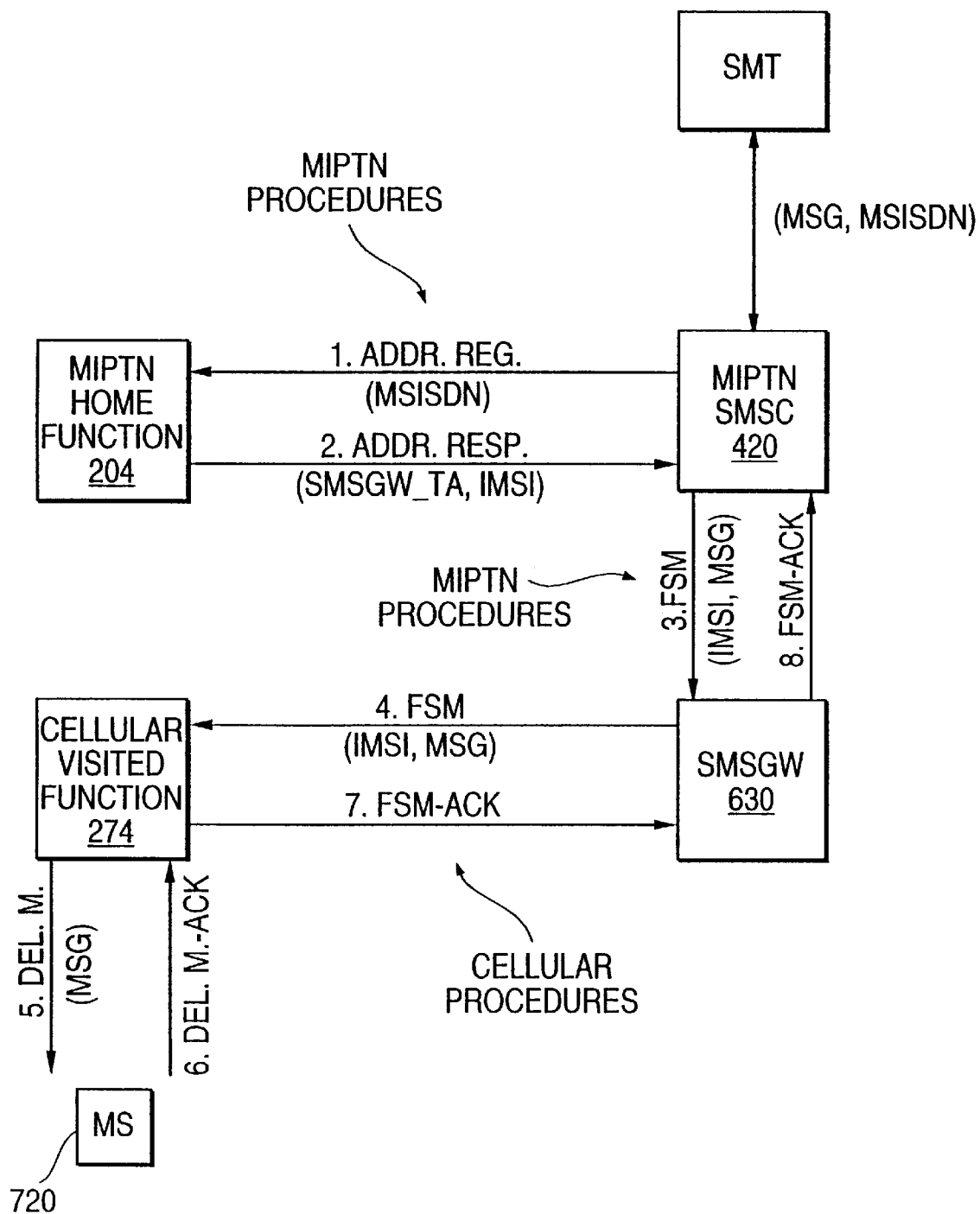
FIG. 22 is a diagram illustrating an example delivery of a short message from an IP-telephony network short message service center to an IP-telephony subscriber that is roaming within a cellular network.

FIG. 22 is a diagram illustrating an example delivery of a short message from an IP-telephony network short message service center to an IP-telephony subscriber that is roaming within a cellular network. The message delivery of FIG. 22 is symmetric to the case in FIG. 21. In FIG. 22, the MIPTN SMSC 420 obtains the IP address (SMSGW_TA) of the SMSGW through which the subscriber can be reached. The message is then forwarded to the SMSGW 630. The SMSGW then uses a dynamic mapping obtained during registration to translate the subscriber IMSI to a cellular address of the cellular Visited Function where the subscriber is located. The message is then delivered to the cellular Visited Function.

Figure 23:
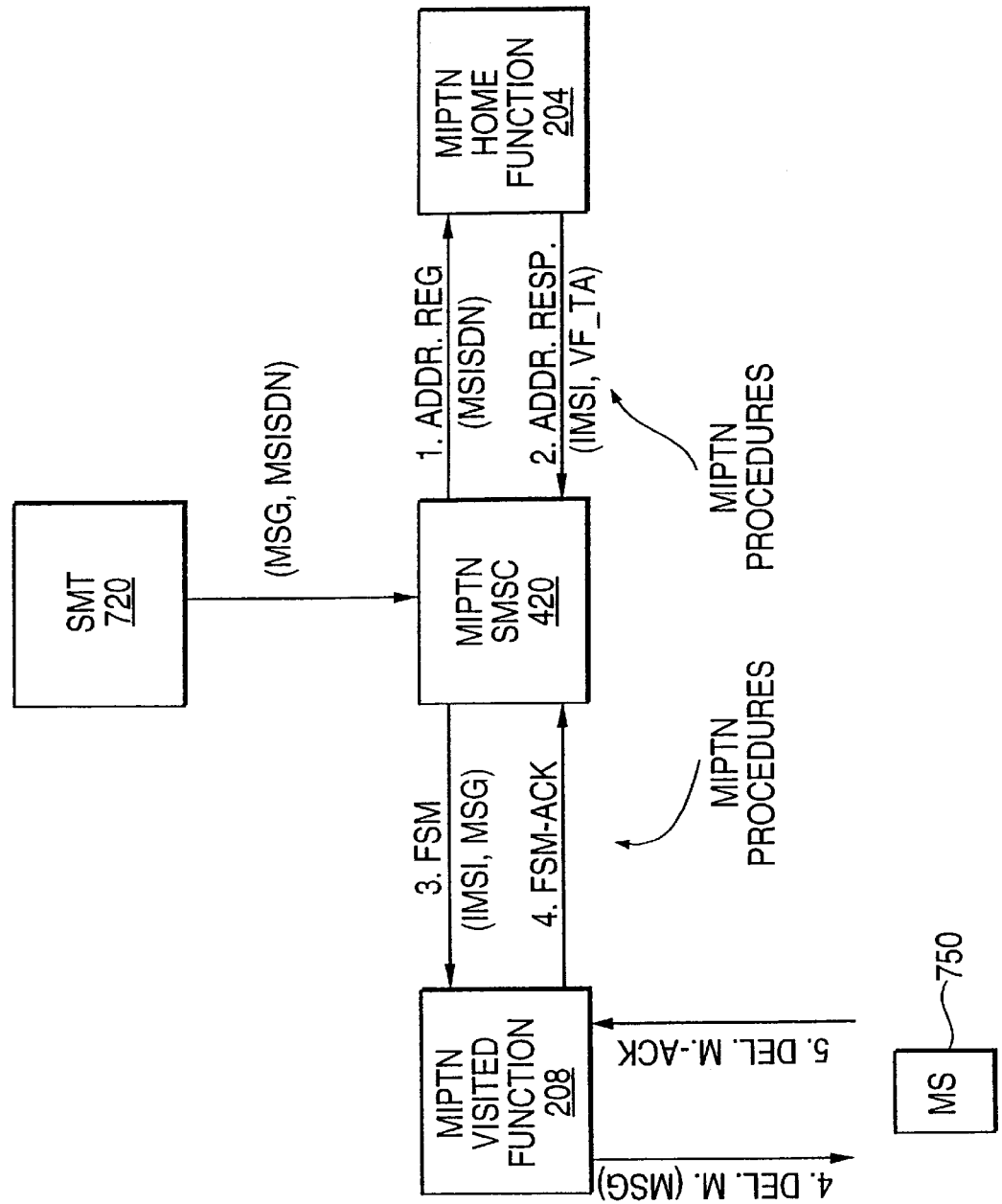
FIG. 23 is a diagram illustrating an example delivery of a short message from an IP-telephony network short message service center to an IP-telephony subscriber that is roaming within an IP-telephony network.

FIG. 23 is a diagram illustrating an example delivery of a short message from an IP-telephony network short message service center to an IP-telephony subscriber that is roaming within an IP-telephony network. At step 1 the MIPTN SMSC 420 sends a message to the MIPTN Home Function 204 of the target subscriber (based on the MSISDN), providing the MSISDN. The Home Function 204 then provides the IP address (VF_TA) of the MIPTN Visited Function 208 where the subscriber is located. The MIPTN SMSC then forwards the short message to the MIPTN Visited Function 208 for delivery to the subscriber.

FIGS. 17–23 illustrate examples of successful deliveries of SMS messages. However, in some cases the message delivery may fail (i.e., an unsuccessful message delivery). In the event of a message delivery failure, the SMSC stores the message (i.e., continues to store the message) and the SMSC will attempt delivery later when alerted by the subscriber's Home Function that the subscriber is available to receive messages.

The SMSC can be notified of the delivery failure (e.g., through a negative acknowledgment notifying the SMSC of the failure, or by the SMSC's failure to receive an acknowledgment within a predetermine period of time). The SMSC then sends a Report Delivery Status (RDS) message to the destination subscriber's Home Function to report the failed delivery, providing an MSISDN (or IMSI) of the destination subscriber. The RDS message may be sent through the SMS GW 630 of Gateway Function 210 to the Home Function. The SMS GW 630 statically translates the MSISDN to the address of the subscriber's Home Function, and forwards the RDS message to the subscriber's Home Function, providing the MSISDN and the address of the SMS GW. The address of the SMS GW 630 is provided to the Home Function so that the Home Function can send an alert message to the SMSC via the SMS GW to notify the SMSC that the subscriber is now available to receive the messages.

The SMS GW 630 also stores a dynamic correspondence between the MSISDN (identifying the destination subscriber) and the address of the SMSC (identifying the SMSC that has a message to be sent to the subscriber). The SMS GW 630 may in fact store a group of SMSC addresses corresponding to one MSISDN, where each of the SMSCs of the group has a message to be delivered to the subscriber.

When a subscriber becomes available to receive the message, the subscriber terminal informs the Visited Function where it is located, and the Visited Function informs the subscriber's Home Function that it is now available to receive messages.

The Home Function then sends an alert message to the SMS GW 630. The SMS GW 630 then uses the dynamic mapping (MSISDN/ SMSC address) to identify the address of the SMSC (or the multiple SMSCs) that have messages to send to this subscriber. The alert message is then forwarded to each of the SMSCs, and each SMSC again attempts to forward the short message to the subscriber.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method of delivering a short message over a packet-switched telephony network comprising:
    receiving a short message, including a subscriber identification which identifies a cellular subscriber to receive the short message;
    forwarding the short message and subscriber identification to a first gateway function;
    the first gateway function obtaining subscriber location information from the subscriber's cellular home function, the location information including a cellular network address of a second gateway function through which the subscriber can be reached;
    forwarding the short message and the subscriber identification to the second gateway function;
    the second gateway function using a dynamic mapping obtained during registration to identify a packet-switched telephony network address of a packet-switched telephony visited function where the subscriber is located; and
    the second gateway forwarding the short message to the packet-switched telephony visited function where the subscriber is located.

2. The method of claim 1 and further comprising forwarding the short message from the packet-switched telephony visited function where the subscriber is located to the subscriber terminal.

3. A method of delivering a short message over a packet-switched telephony network comprising:
    receiving a short message, including a subscriber identification which identifies a packet-switched telephony subscriber to receive the short message;
    forwarding the short message and subscriber identification to a first gateway function;
    the first gateway function obtaining subscriber location information from the subscriber's packet-switched telephony home function, the location information including a packet-switched telephony network address of a second gateway function through which the subscriber can be reached;
    forwarding the short message and the subscriber identification to the second gateway function;
    the second gateway function identifying a cellular network address of a cellular visited function where the subscriber is located; and
    the second gateway forwarding the short message to the cellular visited function where the subscriber is located.

4. The method of claim 3 and further comprising forwarding the short message from the cellular visited function where the subscriber is located to the subscriber terminal.

5. A method of delivering a short message over a packet-switched telephony network comprising:
    receiving a short message, including a subscriber identification which identifies a cellular subscriber to receive the short message;
    forwarding the short message and subscriber identification to a first gateway function;
    the first gateway function obtaining subscriber location information from the subscriber's packet-switched telephony home function, the location information including a packet-switched telephony address of a second gateway function through which the subscriber can be reached;
    forwarding the short message and the subscriber identification to the second gateway function;
    the second gateway function using a dynamic mapping obtained during registration to identify a cellular address of a cellular visited function where the subscriber is located; and
    the second gateway forwarding the short message to the cellular visited function where the subscriber is located.

6. A method of delivering a short message over a packet-switched telephony network comprising:
    receiving a short message at a cellular network short message service center, including a subscriber identification which identifies a cellular subscriber to receive the short message;

forwarding the short message from the message service center to a gateway function including the subscriber identification;

obtaining from the subscriber's cellular home function a cellular address of a gateway function where the subscriber can be reached;

forwarding the short message and the subscriber identification to the gateway function;

the gateway function using a dynamic mapping obtained during registration to identify a packet-switched telephony address of a packet-switched telephony visited function where the subscriber is located based on the subscriber identification;

the gateway function sending the short message to the packet-switched telephony visited function where the subscriber is located.

7. A method of delivering a short message over a packet-switched telephony network comprising:

receiving a short message at a packet-switched telephony short message service center, including a subscriber identification which identifies a packet-switched telephony subscriber to receive the short message;

forwarding the short message from the message service center to a gateway function including the subscriber identification;

obtaining from the subscriber's packet-switched telephony home function a packet-switched telephony address of a gateway function where the subscriber can be reached;

forwarding the short message and the subscriber identification to the gateway function;

the gateway function using a dynamic mapping obtained during registration to identify a cellular address of a cellular visited function where the subscriber is located based on the subscriber identification;

the gateway function sending the short message to the cellular visited function where the subscriber is located.

* * * * *